(12) United States Patent
Uzo

(10) Patent No.: US 9,177,314 B2
(45) Date of Patent: Nov. 3, 2015

(54) METHOD OF MAKING SECURE ELECTRONIC PAYMENTS USING COMMUNICATIONS DEVICES AND BIOMETRIC DATA

(76) Inventor: Chijioke Chukwuemeka Uzo, South Amboy, NJ (US)

( * ) Notice: Subject to any disclaimer, the term of this patent is extended or adjusted under 35 U.S.C. 154(b) by 1229 days.

(21) Appl. No.: 11/551,005

(22) Filed: Oct. 19, 2006

(65) Prior Publication Data

US 2008/0040274 A1 Feb. 14, 2008

Related U.S. Application Data

(60) Provisional application No. 60/822,295, filed on Aug. 14, 2006.

(51) Int. Cl.
*G06Q 20/38* (2012.01)
*G06Q 20/40* (2012.01)
*G06Q 40/00* (2012.01)

(52) U.S. Cl.
CPC .............. *G06Q 20/382* (2013.01); *G06Q 20/40* (2013.01); *G06Q 40/00* (2013.01)

(58) Field of Classification Search
CPC .................................................... G06Q 20/382
USPC .......................................... 705/39, 40, 44, 64
See application file for complete search history.

(56) References Cited

U.S. PATENT DOCUMENTS

| | | | |
|---|---|---|---|
| 6,192,142 B1 * | 2/2001 | Pare et al. ..................... | 382/115 |
| 6,269,348 B1 * | 7/2001 | Pare et al. ...................... | 705/39 |
| 6,662,166 B2 * | 12/2003 | Pare et al. ........................ | 705/39 |
| 7,155,416 B2 * | 12/2006 | Shatford ......................... | 705/67 |
| 7,571,140 B2 * | 8/2009 | Weichert et al. ................ | 705/40 |
| 2002/0152123 A1 * | 10/2002 | Giordano et al. ............... | 705/14 |
| 2007/0288320 A1 * | 12/2007 | Cooper et al. ................... | 705/16 |

* cited by examiner

*Primary Examiner* — Calvin L Hewitt, II
*Assistant Examiner* — Cristina Sherr
(74) *Attorney, Agent, or Firm* — Gearhart Law, LLC

(57) ABSTRACT

Methods and systems for carrying out financial transactions include creating unique aliases for payment instrument having associated identification numbers, associating the created aliases to the payment instruments and enabling consumer use of the aliases to carry out financial transactions. Various special point-of-sale devices may be employed to carry out the financial transactions.

1 Claim, 3 Drawing Sheets

Design 1

FRONT

BACK

Rotating card to use 2nd network

Rotation indicator

Design 2

FRONT

BACK

Rotation indicator

Gives direction in which to swipe card for each network

METHOD OF MAKING SECURE ELECTRONIC PAYMENTS USING COMMUNICATIONS DEVICES AND BIOMETRIC DATA

REFERENCE TO RELATED APPLICATION

This application claims the benefit of U.S. Provisional Patent Application Ser. No. 60/822,295, filed Aug. 14, 2006, the disclosure of which is incorporated herein by reference.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

The present invention relates to making electronic payments using payment instruments such as credit cards, communications devices such as phones and biometric data such as fingerprints. The present invention further relates to methods for ensuring that payments can be made between the payment instruments and/or the communications devices and that the payments are secure. Electronic payments typically refer to payments for purchases and money transfers but more comprehensively refer to any movement of funds between two parties or between payment instruments.

2. Description of the Related Art

Electronic payment transactions typically require at a minimum three parties: a consumer, a merchant and a credit or money disbursing institution such as a bank, hereinafter called the issuer. The issuer provides the consumer with a payment instrument, usually represented as a physical card with a unique instrument identification number or identification code (hereinafter also called the IIN) to which the consumer's funds or credit line are attached. Generally the IIN is both visibly embossed on the physical payment instrument and also electronically stored on it either across a magnetic stripe (also called a magstripe), as a bar code or in a computer chip. The payment instrument may also be virtual, that is, have no physical equivalent, but will still have an IIN and may require a PIN. The merchant has to be approved beforehand by the issuer to accept its payment instrument which usually requires that the merchant install specialized hardware and/or software and that he be given a unique merchant identification number and that he communicate with the issuer and obtain approval for each payment transaction. Transactions for which the issuer approves payment are credited to the merchant either in real time or after an agreed interval (usually two days). Data for the payment instrument and its consumer owner as well as data for each merchant who accepts the instrument is held by the issuer. For electronic payments conducted offline (i.e., in a physical facility as opposed to the Internet or similar network), the consumer has to physically present the payment instrument to the merchant who "reads" the IIN and other identifying data from it and communicates that data along with the payment amount and his merchant identifier to the issuer. Reading the instrument requires that the physical payment instrument be in contact with or close to the merchant's Point-of-Sale device (POS). The issuer on receiving data from the merchant confirms the validity of the consumer's payment instrument, debits him, credits the merchant with funds for the payment transaction, and sends a message to the merchant confirming whether the payment transaction was approved or denied. The process of reading the consumer's payment instrument and communicating it to the issuer can be done manually by the merchant, but is slow, and insecure. For manual processing of a credit card payment, the merchant can read the IIN (i.e., the credit card number) off the consumer's credit card, call the issuer over the phone, provide the credit card number as well as the payment amount for which approval is requested and receive approval over the phone. The issuer will then manually update its records for that payment instrument and credit the merchant. More commonly, however, information that uniquely identifies the payment instrument, that is, the instrument identification number and possibly other transaction data such as the consumer's identity, is read electronically by a Point-Of-Sale device, hereinafter called a POS device, and communicated electronically to the issuer. The issuer confirms that funds are available for the payment instrument, debits (or credits) the Instrument, credits (or debits) the merchant, and then sends a transaction approval or denial message back to the merchant through the POS device.

A similar process is followed for payments online (i.e., the Internet or similar network). The consumer connects to the merchant's web site and enters information for his payment instrument. The merchant retrieves the payment instrument identification number, consumer information and other required transaction data which it then transmits to the issuer in order to get payment approval.

Six key problems arise from these modes of electronic payment:

a) Offline, the consumer has to be at, or physically close to the merchant for his payment instrument to be read. It would be preferable to be able to perform a payment transaction using a communications instrument such as a phone or cellular phone that permits automated, secure payments to any merchant who can be reached by wireless or via the phone network. Phone payments, like long-range wireless payments, make it unnecessary for the merchant to have physical access or close proximity to the consumer's payment instrument to read information from it. This is called a "contact" read meaning that the payment instrument is physically present and read directly by the POS device. The distances over which a phone payment can be performed are much larger than the relatively short distances attainable with the protocols (for example, blue tooth, infra-red and short wave transmission protocols) used for transmitting the IIN (and the PIN when applicable) of the payment instrument to the POS device. In fact, the use of such protocols to read the IIN of a payment instrument are considered "contact" not "wireless" reads because of their short operating distances, and the POS devices that use such protocols are not herein defined as special Point-Of-Sale devices.

In the present invention, phone payments have the transaction characteristics of a payment made by a physically present payment instrument, namely, the payment transaction is immediately approved by the issuer and the consumer's funds or credit lines immediately debited (or credited); processing is secure and automated and takes about the same time as for a physically read payment instrument; processing time is much faster than for a manually processed transaction (described earlier); the phone payments work with any phone or cellular phone and do not depend on the phone carrier; the issuer does not have to contract with any additional parties in order to accept payments: This requires a prior arrangement with the phone carrier, which is not required for the present invention.

b) Merchants who wish to accept phone payments require a special Point-of-Sale device (SPOS) that accepts phone payments, but merchants who already accept an issuer's payment instrument offline would already have a POS device, and would need an additional investment in a SPOS device. A method is needed that would permit merchants to accept phone payments using their existing POS devices; While new merchants would likely purchase new SPOS devices to perform both "contact" and phone payment transactions, most existing merchants will opt to use their existing POS devices to accept phone payments.

c) Online, the consumer has no way of knowing if the merchant's web site—the equivalent of an offline physical merchant location—where his payment instrument information is being entered actually belongs to the supposed merchant. It is common for fraudsters to mimic a merchant's site in order to harvest a payment instrument's data and its consumer information for later fraudulent use. This activity called "Phishing" is the primary reason why payment instrument fraud is about 11 times higher online than it is offline. This is particularly telling for payment instruments (such as debit cards) with no form of consumer authentication. The consumer enters at the merchant's Web site or physical location the instrument identification number, (the IIN) for the payment instrument and his PIN to complete a payment. These PIN-requiring Instruments when used for payments offline are reasonably secure since the IIN is read directly off the instrument by the POS device. So if the instrument is stolen the thief is unlikely to know the PIN, and if the PIN is stolen the thief must also have physical possession of the payment instrument in order to use it. Online however the PIN and IIN are entered in tandem so both can be stolen at once. Since the PIN and IIN combination is all that is required to authorize payment, the likelihood of fraud with such payment instruments is much, much higher online than it is offline. A method is needed to identify fraudsters, who pose as real merchants in order to steal the IIN and PIN of a consumer's payment instrument, and reduce risk from payment transactions online.

d) If a payment instrument is stolen, there is no way of preventing its use or determining that the thief is not the actual owner unless the real consumer-owner reports it lost. Furthermore each consumer must physically carry the payment instrument in order to make payments offline. Using biometric data in addition to or as alternative to a physical payment instrument solves both problems. When biometric data is required in addition to the payment instrument itself, (for example, making a payment using a credit card and a fingerprint), it increases electronic payment security since if the instrument is stolen it still cannot be used. When biometric data is used as an alternative to the payment instrument to perform a payment transaction, it frees the consumer from the necessity of always carrying a payment instrument since he can use his ever-present biometric data, such as a retinal scan, to make a payment. This is quite secure as biometric data is very difficult to duplicate.

e) Several payment instruments (such as gift cards) are not readily convertible to cash nor can they be paid into the consumer's bank account or transferred to other payment instruments or communications devices. Ideally, payment instruments should allow funds on them to be drawn as cash at brick and mortar locations or from an Automatic Teller Machine attached to an electronic funds transfer network, and should enable transfer of funds to other payment instruments, communications devices and bank accounts. It should also be possible to "load" or attach funds from a payment instrument to a communications device following which the device can be used to make payments. The present invention includes description of methods for loading or attaching cash to a phone either from an existing payment instrument such as a stored-value card or bank account or directly by making an offline cash payment.

f) A payment instrument that does not use a PIN (i.e., a non-PIN payment instrument) offers much less security online than one that requires a PIN. The latter is safer because theft of the payment instrument also requires theft of the PIN (This is why loss of an ATM card, a PIN instrument, is less troubling than loss of a credit card, a non-PIN instrument). A method is therefore required that would enable a consumer to select a PIN and require its use for transactions even when making payment with a non-PIN payment instrument. A payment instrument that requires a PIN should offer a method to generate a PIN that is usable One-Time and which expires after a short time interval.

In summary, the problems enumerated above are all solved by the present invention.

OBJECTS AND SUMMARY OF THE INVENTION

It is the purpose of the present invention to provide a method of making electronic payments with a communications device and/or biometric data which is secure, usable offline (i.e., in a physical location) and online (i.e., on the Internet or similar network). Payments with a communications device (such as a phone) make it unnecessary for the payment instrument to be physically in the possession of, or close to the transacting merchant. The invention does not depend on the service provider for the communications device (for example, a phone carrier); is device agnostic (for example, does not depend on a specific type of a cellular phone); enables merchants with special or ordinary Point-of-Sale devices to accept wireless or phone payments; and achieves processing speeds identical to that for payments made by directly reading data off a payment instrument. The invention enables transfer of funds between payment instruments and/or communications devices and/or bank accounts (and vice versa); enables funds to be attached to the communications device either from an existing payment instrument or directly from a cash payment; enables funds on the payment instrument or the communications device to be drawn as cash either from an Automatic Teller Machine or from an offline merchant; enables the payment instrument or communications device to be used for payments in a network to which the issuer does not belong; and provides comparable security for both offline and online payments, and for PIN-requiring and non-PIN-requiring payment instruments. Electronic payments as used here describe any electronic movement of funds from one party to another or from one payment instrument to another and includes transfers to and from a bank account, payments for purchases, money transfers, credits, debits, refunds, bill payments, tax payments, etc.

In accordance with an embodiment of the present invention, a method of carrying out a financial transaction comprises creating a unique alias for a previously established payment instrument having an associated identification number, associating the created alias to the previously established payment instrument, and enabling consumer use of the alias to carry out a financial transaction employing the payment instrument.

As an aspect of the invention, the alias is an image.

As a feature of this aspect, the alias is a digital image, and enabling consumer use includes scanning in an image at a merchant location to produce a digital image and commencing the financial transaction between the consumer and the merchant based upon the alias and the digital image produced from scanning in the image.

As another aspect of the invention, the alias is a photograph or a diagram.

As a further aspect of the invention, the method further comprises creating multiple aliases and associating each of the created aliases to the same payment instrument.

As an additional aspect of the invention, the unique alias is designated by a consumer associated with the payment instrument.

As yet another aspect of the invention, the financial transaction is carried out without the consumer providing the identification number associated with the payment instrument.

As yet a further aspect of the invention, the created alias does not include data that identifies an issuer of the payment instrument.

As yet an additional aspect of the invention, the method includes the step of issuing payment instruments by multiple issuers, each of the payment instruments having an associated unique alias.

As a feature of this aspect, a record of each association is stored in a global database.

As another feature of this aspect, the method includes providing, for each of the issuers, a respective local database containing records for each payment instrument issued by the respective issuer, each record mapping the respective payment instrument to the associated alias, and providing a global database having a record of all of the created aliases, each record in the global database associating the respective alias to an identity of the issuer that issued the payment instrument associated with the respective alias.

As a feature of this feature, at least some of the records in the global database do not identify identification numbers of the payment instruments to which the aliases are associated.

As another feature, enabling consumer use includes identifying the issuer of the payment instrument associated with the alias used by the consumer based on data in one of the records in the global database, and identifying the identification number of the payment instrument based on data in one of the records in the local database of the identified issuer.

As another aspect of the invention, the alias of the payment instrument is a telephone number of a telephone associated with the consumer associated with the payment instrument.

As a feature of this aspect, the payment instrument has no associated physical device with which a financial transaction may be carried out.

As another feature, creating a unique alias includes commencing a telephone call by a consumer between the telephone associated with the consumer and a clearing server, identifying by the clearing server a telephone number of the telephone associated with the consumer, and designating the alias as the identified telephone number.

As a feature of this feature, identifying by the clearing server of a telephone number of the telephone associated with the consumer is carried out by employing caller ID.

As another feature, enabling consumer use includes receiving a telephone call from a consumer, identifying the telephone number of the consumer by employing caller ID, and identifying a payment instrument associated with the identified telephone number.

As a further feature, enabling consumer use includes receiving a pin number from the consumer supplied during the telephone call, and authorizing the financial transaction based on at least the identified payment instrument and the received pin number.

As an additional feature, the pin number is associated with the alias, and the pin number is not associated with the established payment instrument prior to creating the alias.

As yet another feature, the telephone call from a consumer is received by a merchant device associated with a merchant with whom the consumer is having a financial transaction.

As yet a further feature, a location of the merchant device is remote from a location of the merchant.

As yet an additional feature, the method further comprises removing the association to the payment instrument of the telephone number of the telephone associated with the consumer.

As a feature of this feature, the method further comprises, after removing the association to the payment instrument of the telephone number of the telephone associated with the consumer, associating a new telephone number of a telephone associated with the consumer with the payment instrument.

As a further aspect of the invention, the method further comprises removing the association of the alias to the payment instrument.

As another aspect of the invention, the previously established payment instrument does not have a user pin number associated therewith, and the step of creating an alias includes generating a user pin number and associating the generated user pin number with the created alias, and the step of enabling consumer use includes verifying receipt of the user pin number from the consumer during the financial transaction.

As a further aspect of the invention, the alias of the payment instrument is an email address of the consumer associated with the payment instrument.

As a feature of this aspect, creating the unique alias includes receiving by a clearing server an email with the email address of the consumer as a designated sender of the email, and designating the alias of the payment instrument as the designated sender of the email received by the clearing server.

As a further feature of this aspect, enabling consumer use includes identifying an email address of an email sent from a consumer to a merchant, and identifying a payment instrument associated with the identified email address.

As another aspect of the invention, enabling consumer use includes accessing a point-of-sale device by a merchant to instruct the point-of-sale device to commence a financial transaction between the merchant and a consumer, the point-of-sale device being disposed in a vicinity of the merchant, accessing a special point-of-sale device by the consumer to further commence the financial transaction between the merchant and the consumer, the special point-of-sale device being disposed at a location remote from the merchant, and implementing the financial transaction after both accessing the point-of-sale device by the merchant is carried out and accessing the special point-of-sale device by the consumer is carried out.

As a feature of this aspect, accessing the point-of-sale device by the merchant is carried out utilizing a special card resembling a payment instrument.

As another feature of this aspect, implementing the financial transaction is carried out only if the step of accessing the point-of-sale device by the merchant and the step of accessing the special point-of-sale device by the consumer are carried out within a predetermined period of time of one another.

As a feature of this feature, the predetermined period of time is less than one minute.

As a further aspect of the invention, the alias is biometric data.

As a feature of this aspect, enabling consumer use includes the consumer providing the biometric data employing a digital camera.

As an additional aspect of the invention, enabling consumer use includes receiving from the consumer the alias for the previously established payment instrument, an amount to be transferred from the previously established payment instrument to a second payment instrument associated with a second consumer, and the alias associated with the second payment instrument, and commencing a transfer of funds in the amount designated from the previously established payment instrument to the second payment instrument.

As a feature of this aspect, the alias associated with the second payment instrument is a telephone number of a telephone associated with the second consumer.

As a further feature, the method includes automatically calling the telephone number of the telephone associated with the second consumer after commencing the transfer of funds, and informing the second consumer of the transfer during the telephone call.

As another aspect of the invention, enabling consumer use includes receiving from the consumer the alias for the previously established payment instrument, an amount to be transferred from the previously established payment instrument to a new payment instrument to be associated with a second consumer, and a new alias to be associated with the new payment instrument, creating the new payment instrument, associating the new alias with the created new payment instrument, and commencing a transfer of funds in the amount designated from the previously established payment instrument to the created new payment instrument.

As a feature of this aspect, the new alias is a telephone number of a telephone associated with the second consumer.

As another feature, the method includes automatically calling the telephone number of the telephone associated with the second consumer after commencing the transfer of funds, and informing the second consumer of the transfer during the telephone call.

As yet another aspect of the invention, enabling consumer use includes receiving from the consumer the alias for the previously established payment instrument, an amount to be withdrawn from the previously established payment instrument, and withdrawing funds in the amount designated by the consumer, and supplying to the consumer the funds in a form of cash.

As yet a further aspect of the invention, the method includes providing a card associated with the payment instrument to the consumer, the card including first and second magnetic stripes, the first magnetic stripe containing data sufficient to identify a first network, the second magnetic stripe containing data sufficient to identify a second network, and wherein the step of enabling consumer use includes reading data from one of the first and second magnetic stripes to carry out a financial transaction entailing a selected one of the first and second networks.

As a feature of this aspect, providing a card that has the first magnetic stripe on a first surface of the card and having the second magnetic stripe on a second surface of the card.

As a further feature, the card includes indicia to identify that the first magnetic stripe is associated with the first network and to identify that the second magnetic stripe is associated with the second network, wherein the step of enabling consumer use includes ascertaining the magnetic stripe to read based on the indicia and a desired network in which to process the financial transaction.

As still yet a further feature of the invention, the method establishes a new payment instrument having an alias as a telephone number of a telephone associated with a consumer, and enabling consumer use of the new payment instrument by the consumer commencing a telephone call using the telephone associated with the consumer.

As another aspect of the invention, enabling consumer use includes depositing by the consumer funds into the payment instrument.

As a feature of this aspect, depositing by the consumer of funds into the payment instrument includes supplying cash from the consumer to a merchant with whom the consumer is having the financial transaction.

As another feature of this aspect, the alias of the payment instrument is a telephone number of a telephone associated with the consumer associated with the payment instrument, and the method further comprising commencing a telephone call to the telephone number of the telephone associated with the consumer after the funds are deposited, and informing the consumer of the deposit during the telephone call.

As a further aspect of the invention, the method further comprising enabling a consumer to deposit cash via a merchant into a payment instrument having an alias as a telephone number of a telephone associated with the consumer.

As yet another aspect of the invention, the method further comprising enabling the consumer to transfer funds associated with the payment instrument having the associated alias to a second payment instrument having an associated physical card, and enabling consumer use of the associated physical card with an automated teller machine to withdraw funds in a form of cash from the second payment instrument.

In accordance with another embodiment of the present invention, a special point of sale device associated with a merchant comprises telephone communication input adapted to receive a telephone communication from a consumer, a processor for identifying a calling telephone number of the received telephone communication, data input adapted to receive one of an amount of a financial transaction between the merchant and the consumer and a code designating a product to be purchased by the consumer from the merchant, the code corresponding to an amount of the financial transaction, and a transaction processing communication component adapted to supply to a clearing server the calling telephone number, the amount of the financial transaction and data identifying the merchant, and to receive from the clearing server data indicative of whether the financial transaction is approved or rejected.

As an aspect of this embodiment, the telephone communication input is adapted to receive via the telephone communication a pin number from the consumer, and the transaction processing communication component is adapted to provide the received pin number to the clearing server.

As another aspect of this embodiment, the processor is adapted to identify the calling telephone number in accordance with a caller ID technique.

As a further aspect of this embodiment, the processor is adapted to identify the calling telephone number by a consumer manual entry of the calling telephone number.

In accordance with a further embodiment of the present invention, a method of carrying out a financial transaction comprises providing to a merchant by a clearing server a secret phrase corresponding to a payment instrument of a consumer with whom the merchant initiated a financial transaction, providing to a consumer by the clearing server identification data corresponding to an identity of the merchant to whom the secret phrase was provided, and commencing the financial transaction between the consumer and the merchant if the identification data corresponds to the identity of the merchant who initiated the financial transaction.

As an aspect of this embodiment, providing to a merchant includes the steps of providing by the consumer to the merchant an ID code corresponding to the payment instrument of the consumer, providing by the merchant to the clearing server the provided ID code, and providing by the clearing server to the merchant the secret phrase corresponding to the payment instrument corresponding to the provided ID code.

As a feature of this aspect, the ID code is an alias associated with the payment instrument.

As yet another aspect of this embodiment, commencing the financial transaction includes terminating the financial transaction if the identification data provided by the clearing server does not identify the merchant with whom the consumer seeks to carry out a financial transaction.

As yet a further aspect of this embodiment, commencing the financial transaction includes providing by the consumer to the merchant an identification code necessary to carry out the financial transaction if the identification data corresponds to the identity of the merchant who initiated the financial transaction.

As yet an additional aspect of this embodiment, the identification data that corresponds to the identity of the merchant is a URL of a website of the merchant, and the step of commencing the financial transaction is carried out if the URL of the website of the merchant based on the identification data matches a URL of a website visited by the consumer to commence the financial transaction.

In accordance with yet a further embodiment of the present invention, a method of carrying out a financial transaction comprises creating a unique one-time alias for a previously established payment instrument having an associated identification number, associating the created alias to the previously established payment instrument, and enabling consumer use of the one-time alias to carry out a single financial transaction employing the payment instrument.

As an aspect of this embodiment, enabling consumer use includes supplying the one-time alias from the consumer to a merchant, supplying the one-time alias from the merchant to a clearing server, and carrying out the financial transaction if the one-time alias is supplied to the clearing server within a preset time interval after creation of the one-time alias.

As a feature of this aspect, the preset time interval is equal to or smaller than one minute.

As another aspect of this embodiment, the one-time alias represents a one-time pin for the payment instrument.

These and other embodiments, aspects, features and benefits of the present invention will become readily apparent from the foregoing detailed description of the invention.

BRIEF DESCRIPTION OF THE DRAWINGS

The following detailed description, given by way of example and not intended to limit the present invention solely thereto, will best be appreciated in conjunction with the accompanying drawings, in which.

DETAILED DESCRIPTION OF PREFERRED EMBODIMENTS

Figure 1:
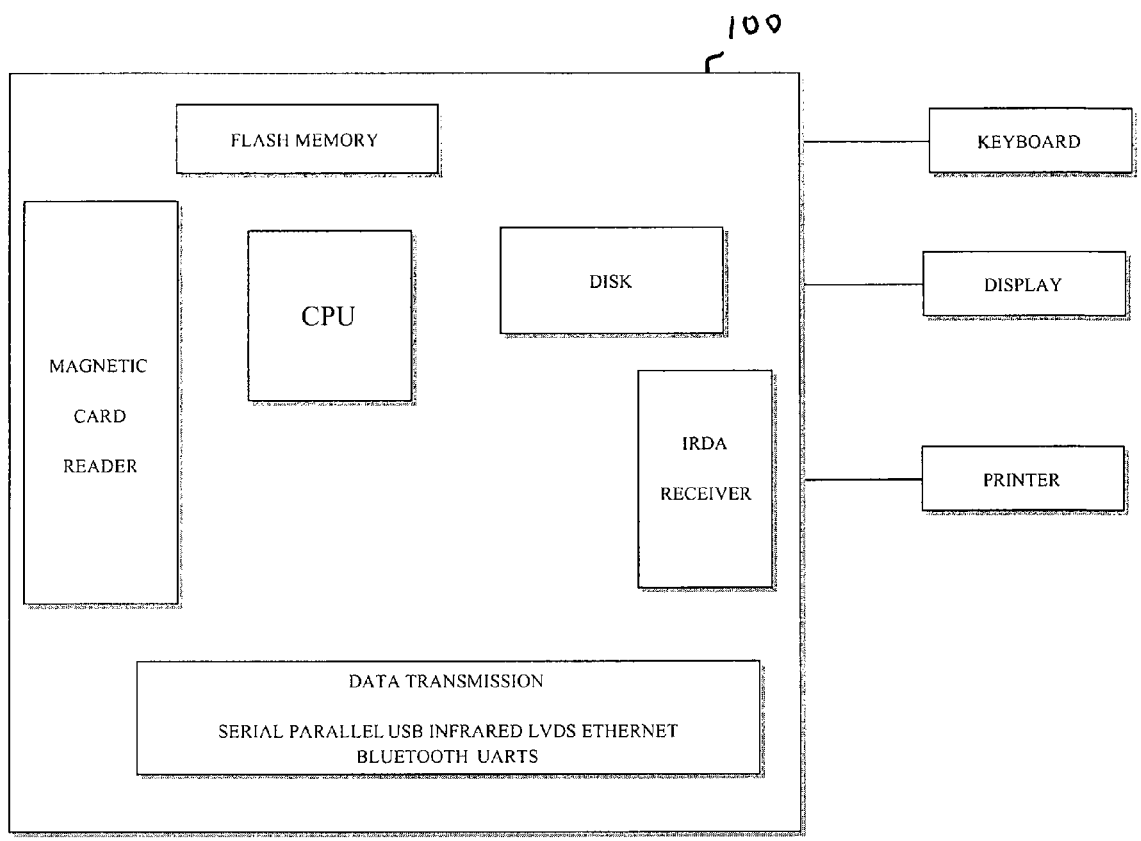
FIG. 1 is a schematic illustration of an exemplary POS Device.

As described in detail below, the present invention pertains to novel methods of making secure electronic payments using communications devices such as phones, or biometric data such as fingerprints. The present invention includes methods for making such electronic payments very secure; for transferring funds from one physical payment instrument, such as a debit card, to another payment instrument or a communications device such as a cellular phone, for linking payment instruments with communications devices, so that either can be used to make payments, and for attaching funds directly to communications devices. U.S. Pat. No. 6,938,019 is entitled "A method of making secure electronic payments" and provides further examples to which the present invention may be applied. U.S. Pat. No. 6,938,019 is incorporated herein by reference.

For purposes of understanding and describing the present invention, the following terms are to be construed and understood as defined below.

Action Request: A request sent to the issuer of a payment instrument to perform an action other than a debiting or crediting of an instrument. This may include but is not limited to display balance, activate the instrument or lock the Instrument. The issuer usually has an Action Code (see below) for each requested action. In the present invention, action codes preferably are sent only if the payment amount is zero.

Action Codes: Numeric codes that tell the issuer of a payment instrument to perform an action on the payment instrument other than debiting or crediting it. The codes are included in the data sent from the merchant to the issuer for payment processing. The merchant receives Action Codes that map to Action Requests within its software and/or hardware when it is approved to accept the issuer's payment instrument. It also receives a hard copy of action request to action codes so that it can manually enter the codes after swiping a payment instrument through its POS device to request a specific action (for example, activate payment instrument or change PIN).

Biometrics: A system of identifying a person using specific, anatomical, physiological or behavioral characteristics of that person. The characteristics used are referred to as biometric data of which the most common are fingerprint, iris, face and speech matching; retinal scan; signature and hand geometry comparisons. For biometrics based payment, the biometric data of the consumer has to be electronically transmissible from the merchant's Point-Of-Sale to the issuer.

Biometric Data: The set of biometric characteristics used to uniquely identify a consumer. This data needs at a minimum to be transmissible electronically in order to be used for payment.

Card: A physical representation of a payment instrument. It generally has an IIN visibly embossed on it and may have a magnetic stripe which also holds the IIN and other payment instrument and consumer data such as the consumer's name. The card may also store its IIN and other data as a bar code or within a chip. Examples of a card are credit card, debit card, stored-value card. The form of the card may be, but is not limited to, a card with a magnetic stripe, a smart card, and an RFID circuit or other electronic device disposed within a physical object, such as a keychain.

Clearing Server: The issuer's computer or computing device which holds payment instrument records, including financial, consumer and transaction information, and receives and processes payment requests. It is also called the issuer's clearing server. If a payment instrument or communications device has a central processing unit and a database that holds the payment instrument records, including the financial and consumer data for each payment instrument, and has the logic for retrieving, updating and transmitting data for a payment operation then that instrument functions as a clearing server. A smart card can therefore be a clearing server.

Clearing Server Database: Database on the clearing server that holds payment instrument records including associated consumer, financial and transaction data, merchant records, transaction information, and all data required to process, store and transmit electronic payment transactions for each payment instrument. It has several tables including an IIN table (see IIN below) for retrieving IIN records, a seed table for finding the seeds for each IIN, alias tables for resolving an alias to its IIN, a merchant table, consumer table, a SPOS-to-merchant table, etc.

Communications Device: A device such as a regular telephone, cellular phone, personal digital assistant, or other communications device which can communicate with a SPOS device. Phones and cell phones are considered long range communications devices. PDA's with an infrared transmitter are considered short range communications devices. Other electronic devices may be employed.

Consumer: A person who is making (or receiving) an electronic payment using a payment instrument. The term may refer either to the consumer or the consumer's computer device with which he makes a payment online.

Electronic Payment Network: A network of members who each agree to process payment instruments issued by other members. Since each member keeps records of the payment instruments it issues and is responsible for authorizing or denying payment transactions for that instrument, a way is required to identify the issuer of each payment instrument and to forward payment requests to that issuer from any member or merchant who receives a payment request. The former is accomplished using the IIN of the payment instrument and the latter by using a gateway, which can forward requests to any member of the network. When the merchant processes payment requests for instruments from different networks it also has to know to which network to forward requests. The network to which an instrument belongs is also part of the IIN of that instrument: It is usually the first digit of the IIN.

Instrument Identification Number (IIN): A number that uniquely identifies a payment instrument. A credit card number, for example, is the IIN of the credit card.

Issuer: The institution or entity that issues the payment instrument to the consumer and processes payment transactions from approved merchants using its clearing server and clearing server database (described below). The issuer gives approved merchants the authority and tools (such as software and hardware devices) with which to process payment transactions for the issuer's payment instrument. All data on the merchant, consumer, payment instrument and other processing and transaction information is stored by the issuer.

Merchant: A seller or vendor who accepts payment made by a consumer with a payment instrument or may perform money transfers for a consumer on behalf of the issuer. The merchant may be offline or online and is approved beforehand by the issuer to accept the issuer's payment instrument. The merchant may also refer to the merchant's physical location, online web site or computing device.

Merchant Identification Number (MIN): A number assigned by the issuer to a merchant that uniquely identifies the merchant.

Money Transfer Phone Number: A phone number provided by the issuer or its representative that the consumer calls to perform a phone money transfer. It is the phone number of a SPOS device (see below).

One-Time-PIN (OTPIN): A code generated for a specific payment instrument that can only be used once. In the present invention there are several types of OTPINs. One type is set to be used within a fixed time interval (e.g., 60 seconds). The time interval may be configurable.

One-Time PIN Generation Software: Software downloaded by a consumer to a computer or communications device such as a cellular phone which generates OTPINs Offline: A physical location (i.e., a brick and mortar location) at which a payment transaction is conducted.

Online: Communication with a computer network such as the Internet that can be accessed using a computer and specialized software such as a browser.

Payment Instrument: An electronic payment instrument that may be represented by a physical card such as a debit card, a credit card or a stored-value card (see below) and is used to make payments. It may also be a virtual payment instrument for which no physical version exists but which will have at a minimum an IIN (and possibly a PIN) with which payments can be made. The payment instrument represented as a physical card holds information, usually on a magnetic stripe, bar code or computer chip, which is read by the merchant's POS device. Payment instruments are either PIN payment instruments, i.e., requiring a PIN for a payment transaction, or non-PIN payment instruments, i.e., not requiring a PIN for transactions.

Payment Instrument Identifier: The IIN or alias uniquely identifying a payment instrument. Either is a payment instrument identifier.

Personal Identification Number (PIN): A number that the consumer enters along with the IIN for some payment instruments (e.g., a debit card) in order to perform a payment transaction.

Phone: A telephone or cellular phone. A phone payment therefore refers to a payment that can be made with either a regular telephone or a cellular phone.

POS Device: Point-Of-Sale device that receives and transmits payment instrument data required to make an electronic payment. An exemplary POS device 100 is shown in FIG. 1. A POS device generally is used by merchants to receive electronic payments for purchases, but can be used for other purposes including money transfers. The POS device computes an amount, or is connected to a device such as a cash register that computes the amount, for which payment is due. For electronic payments, the POS device reads the consumer's payment instrument or biometric data e.g., fingerprint, and sends that information along with the merchant's identification number and payment amount to the issuer. It may also read data from the payment instrument using a short-range wireless communication protocol e.g., Bluetooth or an infrared device, but is still considered a regular POS device. A POS device that can receive payment instrument data by phone or through a long range wireless protocol is a special Point-of-Sale device (SPOS. See below). Each POS device has a unique address (such as an IP address or terminal ID) with which the issuer identifies and contacts it. This address can be mapped to a merchant in tables within the clearing server database of the issuer, so that communication from a particular POS identifies the merchant.

Proxy SPOS Device: A SPOS device (see below) set up by an issuer for a merchant who only has a POS device but wants to be able to accept phone payments.

Recipient: A consumer who receives funds into his payment instrument sent by a transferor (see below). The recipient also refers to the payment instrument that receives a funds transfer.

Stored-Value Card: A payment instrument that holds funds (as opposed to a credit line), has an IIN and often requires a PIN to perform payment transactions. Like a debit card, it may have a magnetic stripe, but may instead have a computer chip or bar code, that can be read by a POS or SPOS device for payment transactions. The stored-value card can be purchased offline, can be empty, (i.e., have no funds), but can have funds added to and drawn from them. Empty cards may have a record in the issuer's clearing server database (Record Present Empty Card—RPEC) or may have no record in the issuer's database (Record Absent Empty Card—RAEC). In the present invention, funds transferred to stored-value cards are immediately available for payments and can be drawn as cash. When purchased offline they may be either ready for use or inactive. In the latter case they need to be activated which is a process of either creating a PIN or attaching funds to them or making already attached funds available for payment transactions.

Transaction Phone Number: A phone number provided by the merchant that the consumer calls to make a phone payment. It is unique for each merchant and is the phone number of the SPOS device that receives and forwards the consumer's phone number, PIN, and payment amount and MIN to the issuer. The merchant displays or communicates this phone number to its consumers so they can call it to make a phone payment.

Transferor: A consumer who performs a transfer and from whose payment instrument funds are drawn and transferred to the payment instrument of another consumer, i.e., the recipient. The transferor also refers to the payment instrument from which funds for a transfer is drawn.

Figure 2:
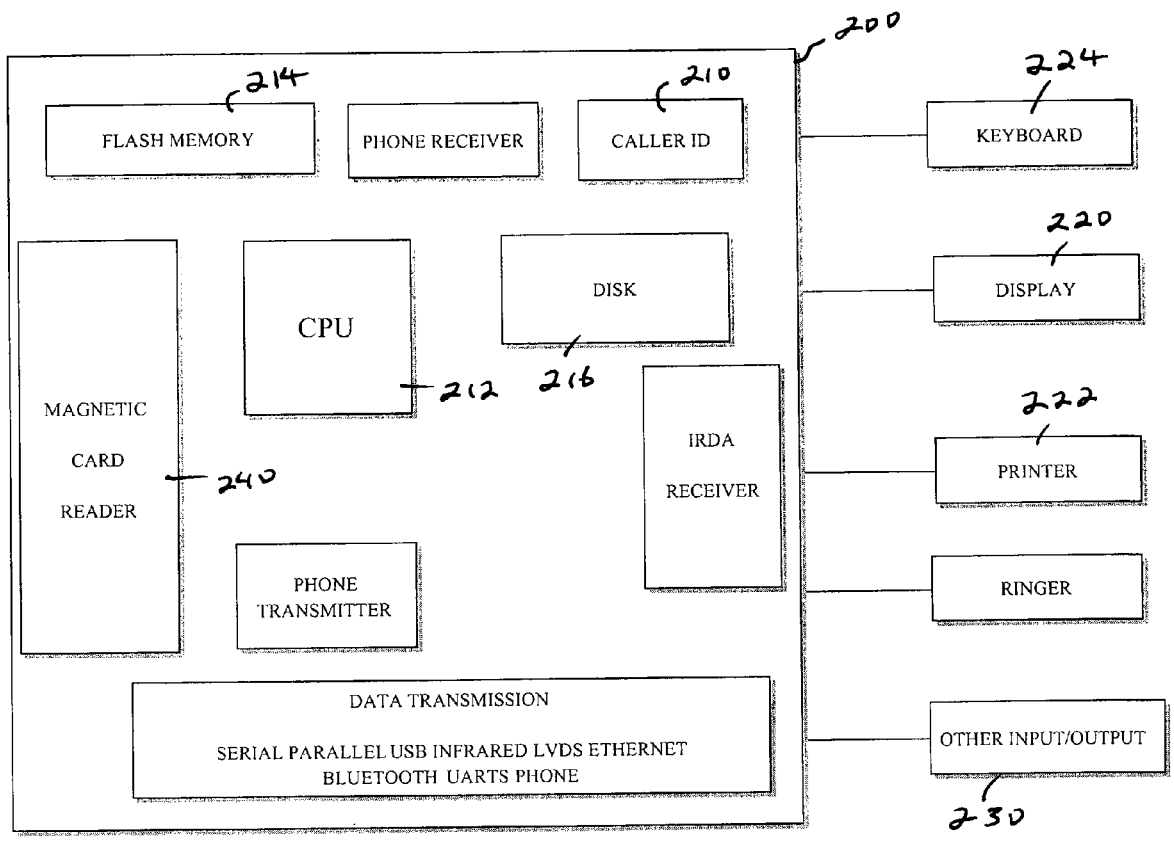
FIG. 2 is a schematic illustration of an exemplary SPOS Device.

SPOS Device: A Point-Of-Sale Device for receiving phone payments. An exemplary SPOS device 200 is shown in FIG. 2. The SPOS device may be connected to a phone line or operate like a cell phone by wireless. It is like a computer in that it also functions like a telephone, can make and receive phone calls, and has a unique address through which the issuer contacts it. The SPOS may include a Caller-ID device 210 with which it identifies the phone number of the consumer who calls it to perform a phone payment and can send voice or text confirmation for a payment to the consumer. It also has a central processing unit 212, memory (e.g., flash memory 214), permanent storage 216 (e.g., a hard disk), and a network access card and/or a dial up port either or both of which are used to communicate with the issuer. The SPOS device may have an operating system, a monitor display 220, a printer 222 for printing receipts, and a port 230 for connecting to a cash register device or other input device. The SPOS device may run software provided by the issuer with which it reads, processes and transmits payment instrument data. SPOS devices are often designed to read and forward payment data for more than one issuer or for different types of payment instruments. The merchant may also load item codes into it representing the price and description of items for which phone payments can be made remotely. In addition to a "payment by phone" button (which is absent on ordinary POS devices), it may include options for payment by debit card, credit card, check, and cash. The non-phone options may require a keyboard 224, a reader 240 (such as magnetic card reader for reading the magstripe on a credit, debit or gift card) or a specialized scanner for reading, digitizing and transmitting consumer biometric data such as fingerprints. It may either function as a cash register or be connected to a cash register device from which it receives the total payment required from the consumer. Except when drawing a distinction between phone and non-phone transactions, the term POS device is used to refer to both SPOS and POS devices.

Description of the Present Invention

Payment instruments such as credit cards, debit cards, and virtual digital currency are usually issued by a third party (such as a bank or financial institution), hereinafter called the issuer, to an entity or individual, hereinafter called the consumer, who may use it to make purchases at a participating vendor (hereinafter called the merchant). The issuer ensures that the payment instrument is backed by funds or a line of credit, which allows a consumer to use it to make payments. The consumer can then use his payment instrument for purchases at a participating merchant or to send payments to a third party through an intermediary. Since there may be different issuers of one type of payment instrument to the same consumer or one issuer of the same type of payment instrument to several consumers, each instrument needs to be uniquely identifiable. Uniqueness is assured by assigning each payment instrument a unique instrument identification number, hereinafter called the IIN. The IIN therefore uniquely identifies a payment instrument, its issuer, its type, and any network it belongs to. It allows easy retrieval of all data, including available funds, credit, consumer and transaction information, held in the issuer's database, which are required to process payments. Since one payment instrument is typically issued to one consumer, the IIN is often used to refer to the consumer as well as to the payment instrument.

For a purchase, the merchant "reads" the IIN for the payment instrument (either manually or electronically through a Point-Of-Sale device) and sends a request to the issuer, which includes the payment instrument IIN, the payment amount, and the merchant's identifier. It may also include information on the consumer or additional numbers on the card. Reading is the process of accessing data stored on the card. The merchant's request may be sent directly to the issuer or indirectly through intermediaries. The issuer receives the IIN in the merchant's request and then debits or credits the funds or credit line for the payment instrument associated with that IIN, credits or debits the merchant, and then sends confirmation (or denial if the transaction fails) to the merchant. To do this it retrieves the customer and financial information associated with that IIN from its database and then approves or denies the transaction usually based on if the consumer has enough funds or credit to make the purchase or payment. It may also use any additional information sent by the merchant such as the consumer data or other numbers on the payment instrument to authenticate the consumer and to confirm that the payment transaction is being carried out by the consumer who is in actual physical possession of the card. The issuer then communicates its approval or denial back to the merchant. When an approval is received, the consumer is deemed to have made payment, and the merchant receives credit, which is usually paid into his bank account the following day. For a purchase transaction, the merchant releases the purchased goods or services and receives payment from the issuer. This process of communication and reimbursement may be directly from the issuer to the merchant or from the issuer through intermediaries to the merchant. If the issuer denies payment, the merchant does not release the goods or services.

With known transaction processing the IIN is used to identify the issuer and the consumer and to confirm the validity of the payment instrument IIN itself. For this reason, the IIN is often divided into portions or segments some of which uniquely identify the issuer or the consumer, and some of which may represent security characters, encrypted text, or a hash number. The hash number is derived by running the IIN through an algorithm that generates a unique number which is then included in the IIN. This makes it difficult to generate an IIN by accident and makes it possible to identify numeric or alpha-numeric sequences that cannot be an IIN. Segmenting the IIN into portions that carry information makes it easy for the merchant to identify the issuer from a number of possible issuers and enables the issuer on receiving an IIN to immediately identify the type of payment instrument, the consumer to whom it was issued and other information specific to that instrument. The issuer can then retrieve the financial and consumer data for that payment instrument, such as the consumer's name, address, funds or credit line, and can then debit or credit the funds or credit line available for that instrument. Although the IINs of two payment instruments may have identical portions, the entire IIN for each payment instrument must still be unique. For example, the numeric, alphanumeric or alphabetic segment which represents the issuer will be the same for different payment instruments issued by a single issuer even though the entire IIN will be different for each instrument.

Segmenting the IIN into portions that represent embedded information simplifies processing but is not theoretically necessary. In accordance with the present invention, an issuer can map each payment instrument record to a randomly generated IIN, in which case the IIN does not have to have intrinsic information but is used to retrieve all the data associated with that payment instrument. This means that although the IIN is typically numeric, it may be made up of a random string of numeric, alphanumeric, alphabetic characters, or be comprised of digital, audio, biometric, visual, or audio-visual data. It needs to be associated with a set of data for a particular payment instrument in the issuer's records. All that is required is for the merchant to send the data to the issuer and for the issuer to be able to use the IIN in whatever format to retrieve and update data from its database for that payment instrument. This data would at a minimum give the funds or credit line available for this payment instrument but may also include consumer information, instrument issue date, expiration date, transaction history, that is, financial, consumer and transactional information for that payment instrument. All that is required is that the IIN be unique and that it is mapped to a record that holds all the data for a specific payment instrument in the issuer's clearing server database. In database terms, each IIN would be a unique index for each payment instrument record in a database table where each record contains the data for each payment instrument.

Some known payment instruments, such as a debit card, are called PIN payment instruments, as they require that the consumer enter both the IIN for his payment instrument and a Personal identification number (PIN) in order to make a payment. Both the IIN and PIN are submitted by the merchant, along with the merchant's identification number and payment amount, to the issuer. The issuer receives this data and confirms that the PIN is correct for the payment instrument, and utilizes the IIN to retrieve data for the payment instrument from its database. Thereafter, the issuer debits (or credits) the funds for that payment instrument, credits (or debits) the merchant, updates each record in its database affected by this transaction (i.e., the transaction history) and then transmits an approval (or denial) to the merchant through the merchant's POS device. If the transmitted PIN does not match the PIN held by the issuer, or the consumer does not have sufficient funds or credit, the issuer denies payment and transmits a denial to the merchant through the merchant's POS. The operations performed by the issuer may be performed by the issuer's clearing server.

Where an action other than a debit or credit is required the merchant sends a zero payment amount and includes a numeric code that represents a required action, along with the IIN, PIN and his MIN. The issuer validates all the data received, retrieves the instrument records and then consults an action table to determine the action represented by the code (for example, "give payment instrument balance" or "activate payment instrument"). It then performs the required action and sends a response to the merchant. Whenever it receives a zero payment amount, therefore the issuer expects to perform an action other than a payment transaction on the payment instrument. Several other known schemes can be used by the issuer for performing non-payment actions on a payment instrument. However, the method described here allows a merchant to perform any action allowed by the issuer with the same POS or SPOS device used for payment transactions.

Aliasing

In accordance with the present invention, an alias as used herein is an object which is associated with the IIN of a payment instrument so that it can be used anywhere the IIN can be used. In some embodiments, it is used with the IIN or permanently replaces the IIN. Alias may be used as a verb (i.e., aliased, aliasing, aliases) throughout the present invention to describe the process of creating an alias. When the mapping between the payment instrument and the alias is removed, the payment instrument is said to be unaliased and the process is described as unaliasing.

The alias may be a number, a binary file, an image, a piece of text, biometric data, bionic data or any piece of information that can be uniquely identified and electronically transmitted. The merchant forwards the alias to the issuer who resolves it to its IIN (i.e., finds the IIN for that alias) and then uses the IIN to retrieve from its database the data for the payment instrument. It can then perform payment processing. Aliasing is further discussed below.

The consumer is first issued a payment instrument from the issuer following which he receives a payment instrument with a unique IIN. In an illustrative embodiment, the issuer first creates in his clearing server database a table, the IIN table, that holds data for each payment instrument it issues and saves under the IIN for that payment instrument all its consumer, financial, and transactional information. Data for any payment instrument can be retrieved from the database with its IIN. A new payment instrument will have a record created in this database and then the consumer is either mailed the payment instrument (like a credit card) or informed by mail or email (where it is a virtual instrument) that a payment instrument has been issued to him. In either case, the payment instrument has an IIN which uniquely identifies it and is used to retrieve and update the data records for the payment instrument, be it physical or virtual.

Creating an Alias

The consumer may now create an alias for that IN, a process hereinafter called aliasing. The alias is a unique object which is associated with the IIN and can be used anywhere an IIN is required. To support aliasing, the issuer's clearing server, in one embodiment, creates an alias table, in its clearing server database and maps an alias entered by the consumer to his payment instrument IIN. Each alias within the table must be unique and is mapped to only one IIN although each IIN may have several unique aliases. The clearing server needs to be able to identify the IIN associated with any alias and may do this by creating a table with each alias as a unique key and the IIN as a field. Aliasing is therefore the process of associating an IIN with an alias, where the alias is any uniquely identifiable and electronically transmissible piece of data, so that the alias can be used in place of the IIN (or with the IIN, or permanently replace the IIN) to perform payment transactions. The consumer can perform aliasing directly through the issuer, (e.g., by phone or through the issuer's web site) or through a merchant, or through an intermediary. The actual process of mapping the alias received from the consumer to the IIN of his payment instrument is performed by the issuer's clearing server. This process can be delegated to an intermediary who has access to the alias tables on the issuer's clearing server database. The issuer may simultaneously write to its alias table and an external alias table which is accessed by intermediaries. This is preferred where the issuer is a member of an electronic payment network where each member issues a payment instrument accepted by every other member.

Aliasing in an Electronic Payment Network

In an electronic payment network, where each member of the network issues a payment instrument accepted by every other member, the IIN of the instrument is used to identify both the network and the issuer. Aliases do not contain information on the issuer which means that aliases must first be resolved to the actual IIN of the payment instrument in order to identify the issuer and route payment requests to it. Each member of a payment network needs to be able to resolve an alias to the issuer or to the IIN for a payment instrument issued by any member of the network. This may be achieved by having each member of the network write its alias records to a shared database or to both a shared database and its own local database. The shared database includes all aliases in the network and can be queried by each network member or by a gateway or by a POS device to obtain the IIN of a payment instrument. When the issuer maintains its alias data in a local database, the alias record in the shared database need not map the alias to the payment instrument IIN, but instead maps the alias to the issuer so that payment requests can be routed to it. The issuer can then use its local alias table to obtain the IIN and process payment. Other embodiments are possible. In any event, the objective is to enable any member of a network to use the alias for a payment instrument issued by a member of that network to route a payment request to that issuer. This is also desirable where an issuer distributes payment processing across many computers or delegates issuing and/or processing of payment instruments to one or more other entities. Each issuer can resolve the alias by querying a shared database that maps aliases to issuer for all members, or aliases to IINs for all payment instruments. In another embodiment, access to the shared database is delegated to a gateway, which each issuer queries to resolve an alias. The gateway itself may categorize or distribute the alias tables in a fashion which reduces processing load. In an illustrative embodiment described, the POS device for a merchant in an electronic payment network acts as a gateway and first resolves any alias to the issuer by querying the shared database. It then forwards the alias along with the payment instrument IIN, PIN and amount to the issuer. Each issuer maintains alias to IIN mappings for each alias in the alias tables of its local database and also writes into a shared alias database a mapping of the alias to the issuer's number for that network. The merchant POS device therefore always sends the payment request to the payment instrument issuer.

Aliasing by Phone

Aliasing can also be done by phone provided the consumer has already been issued a payment instrument. The consumer calls a phone number provided by the issuer, enters the IIN (and PIN if required) of his payment instrument number and additional information which authenticate him as the payment instrument owner. This information, such as the consumer's date of birth, is usually obtained by the issuer before it issues the payment instrument. Once authenticated, the consumer then supplies the alias, (which for phones is usually a number) to which his payment instrument should be aliased. The issuer's clearing server then maps this alias to the payment instrument IIN in the alias tables of the clearing server database. Phone aliasing is often limited to numeric aliases because of the difficulty of using the phone key pad to enter non-numerals. Although the phone aliasing can be performed by having the consumer talk to a live operator, the consumer's alias entries may be entered using his phone keypad in response to automated voice prompts or may be delivered entirely as text using phones that are SMS (Short Message Service) capable. For manual processing the issuer can call the consumer, authenticate him by asking for information provided earlier and then confirm and use the information in the SMS message. In another embodiment, the SMS message is sent in a defined format (for example, IIN; alias; consumer;) which the issuer parses to extract the IIN and required alias. The Issuer then initiates an automated call to the consumer, that prompts him to confirm the SMS information, and provide authentication information using his phone key pad. The issuer thereafter makes an entry in the alias table of the clearing server database which maps the alias provided by the consumer to his payment instrument IIN.

The issuer may choose to have all aliasing done online at the issuer's web site but allow aliasing by phone only where the alias is the consumer's phone number and the consumer calls from that phone. In that embodiment, the phone number from which the consumer is calling will be the alias and by using a Caller ID Device, the clearing server can obtain the consumer's phone number and alias it to the IIN of the payment instrument. The issuer may first require that the consumer provide authentication information. Where the requested consumer authentication information is entirely numeric (e.g., the consumer's birth date or zip code collected prior to issuing the payment instrument to the consumer) then aliasing by phone can be completely automated on any phone. The consumer calls the issuer's phone number and steps through automated voice prompts, providing answers for each prompt by using his phone key pad. The questions would at a minimum obtain the consumer's PIN but can include consumer authentication information. For example:

1. Using you phone key pad enter your PIN
2. Reenter PIN to Confirm
3. Enter Date of Birth
4. Reenter date of Birth to Confirm
5. Enter Zip Code
6. Reenter Zip Cod to Confirm Once the IIN, PIN and consumer authentication information is obtained the phone number from which the consumer is calling is aliased to the IIN of his payment instrument by mapping it to his IIN in the alias table of the issuer's clearing server database.

After a payment instrument is aliased, any of the aliases for that payment instrument can be used in place of its IIN. For example, if a consumer enters his phone number as an alias for his IIN, then in order to make a payment online requiring his IIN and PIN, he can enter instead his phone number and PIN. The merchant receives and forwards the alias, (i.e., the phone number) and the PIN to the issuer's clearing server for payment processing. Similarly if a consumer aliases his IIN to his email, he can enter his email in place of his IIN at a merchant's web site to perform a purchase. One of the functions of aliasing is that it makes it easy for the consumer to perform payment transactions even if he cannot remember his IIN, by instead using a phone number or email, or an object that he finds easy to remember. Two key types of aliasing are email aliasing and phone aliasing. For online money transfers (described in the money transfer section below), the money transfer recipient can give out his email or cell phone number, which are aliases for his payment instrument, to the money transferor. Either one will probably be easier to remember than the IIN, which is often a 16 digit number. The consumer's payment instrument IIN needs to be aliased to his phone before he can make phone payments or send and receive funds by phone.

Processing an Alias Used for Payment

The clearing server on receiving a payment instrument identifier (which can be an alias or IIN) first checks the alias table and then the IIN table in its database. If the identifier is an alias, the clearing server will find it in the alias table, will then retrieve the associated IIN, and will use that to retrieve the financial, consumer and transaction data for that payment instrument from its clearing server database. If the payment instrument identifier is an actual IIN then it will not be in the alias table but will be in the IIN table and it will be used similarly to retrieve the payment instrument records. Naturally, requests for payment instruments whose identifier (alias or IIN) is in neither table will be denied.

To simplify processing, the issuer may specify formats for the IIN, which will help it determine which table to search. For example, an issuer may make all IINs 16 digit numbers that always begins with a 4. In this way if the clearing server receives a payment instrument identifier which is numeric but which does not begin with the number "4" or which begins with a "4" but is not exactly 16 digits, then it knows this is not an IIN and will only search its alias tables. If the alias received by the clearing server is not numeric, but its IINs are numeric then the clearing server will only check the alias table. Other schemes can be used to reduce the time required to retrieve the data records when aliasing. For example, the clearing server may request or permit only aliases that are implicitly unique, for example, a phone number, email address or fully qualified domain name. This means that when the consumer selects an alias the clearing server does not have to run through the entire alias table to determine if that alias already exists. The issuer may also choose to generate aliases for the consumer in a manner that guarantees uniqueness.

After an alias is created, the clearing server may require for payment that:

i) Either the alias or the IIN be used for payment transactions.

ii) An alias has to be presented in combination with the IIN. A customer will then have to use both the alias and the IIN to perform a payment transaction.

iii) Only the alias is to be used for payment transactions. If this is for all payment instruments then the issuer only searches its alias table in its clearing server database. If it is only for a specific payment instrument, then the IIN record for that payment instrument is flagged so that data from it cannot be retrieved directly but will require an alias. One simple method is to change its index in the IIN table from IIN to IIN+alias, and change the alias table so the alias resolves to the IIN+alias.

Email Aliasing

The consumer can alias the IIN to an email address. This allows the email to be used in place of the IIN and is easier for the consumer to remember than an IIN. For money transfers (described below), the consumer can give out his email address instead of his IIN in order to receive funds transfers. Aliasing is performed via the previously described aliasing method. The consumer specifies an email address as an alias for the IIN. The email alias is entered into the alias database by the clearing server and is now associated with the IIN. Subsequently if the clearing server receives the IIN or the email address it can retrieve the payment instrument records from its database. The email alias is mostly used online as the "@" sign in email addresses may be difficult to enter on some phones when used for offline payment transactions. A small merchant who wishes to minimize set-up costs for accepting payments may display his email and request purchasers to send funds directly into it in payment for purchased items. Such funds go directly into the merchant's payment instrument and do not have to be accessed through intermediaries.

Phone Number Aliasing

For phone aliasing, the consumer aliases his IN to a phone number so he can use the phone number in place of his IIN for payment transactions. The phone number may be for a regular phone or a cellular phone. A phone alias is created beforehand if the consumer is to be able to make phone payments, or send/receive money transfers by phone. In one embodiment phone payments can only be made with the particular phone whose number was aliased to the IIN. In another embodiment, phone payments can be made from any phone but requires manual entry of the specific phone number to which the IIN of the consumer's payment instrument was aliased.

Removing an Alias

An alias can be removed by removing the mapping between the alias and the payment instrument IIN. This is performed by the clearing server by removing the alias from the alias table of its clearing server database. The process is described as unaliasing and the payment instrument is said to be unaliased. Unaliasing removes a specific alias and since a payment instrument can have several aliases removing one alias does not affect the other aliases as it removes only the record for that alias from the alias tables. One, some or all the aliases for a payment instrument can be unaliased. Unaliasing is used for example if the consumer changes his phone number or his email and no longer wants to use that alias for making payments. It is also useful where fraudulent activity is detected on an alias. Unaliasing means that the alias, since it is no longer associated with a payment instrument, and can no longer be used for payments.

Payment Methods

Phone Payments with SPOS Device

The consumer first aliases his payment instrument to the phone number of the phone which will be used to make phone payments. Phone payments can be used both for payment instruments that require an IIN and a PIN (e.g., a debit card) and for those that require only an IIN (e.g., a credit card). The following is an illustrative embodiment using a payment instrument that requires an IIN and a PIN.

For phone payments, the merchant provides a phone number, called the transaction phone number, which the consumer dials, and then enters his payment instrument PIN using his phone keypad in order to make payment. This transaction phone number is the phone number of the merchant's special Point-Of-Sale device which also has a device for caller line identification service or Caller ID device. The Caller ID service is based on U.S. Pat. No. 5,907,604, which is incorporated herein by reference. The Caller ID device, whether attached to or built into a phone, identifies the phone number of a caller. In the SPOS device it obtains the consumer's phone number.

Merchants who do not have a SPOS device but who wish to accept phone payments may have a phone number assigned to them by the issuer and are thereby able to accept phone payments. The steps for this method are described under "Phone payments without a SPOS device."

The SPOS device enables the consumer to submit their phone number alias for his IIN along with his PIN to the merchant using a phone. The SPOS sends the amount for which payment is required, along with the consumer's phone number, PIN and merchant MIN to the issuer. The payment amount is either computed on the SPOS device (for example, as payment due from the consumer for a purchase) or fed into the SPOS device from a cash register device or entered manually into the SPOS device through its keyboard.

When the consumer calls the merchant's transaction number, the Caller ID device on the SPOS identifies and saves the phone number of the caller which is the alias for payment instrument IIN. The consumer, once connected, enters his PIN using his phone key which is received by the SPOS either as tones or pulses and translated into their equivalent numbers. The phone number and PIN, along with the payment amount, and merchant's MIN is then transmitted by the SPOS through a wired or wireless network or point-to-point connection to the issuer's clearing server. The SPOS device is therefore functionally similar to an ordinary POS device which reads the IIN directly from the magnetic stripe or chip on the payment instrument, accepts the consumer's PIN from a key pad, and then sends the IIN and PIN with any other transaction data to the issuer. The SPOS device may also process non-phone payments if it includes hardware with which to directly read data off a payment instrument placed on or close to it. The IIN can be visibly embossed on the card and also electronically stored on it in a variety of formats including on a magnetic stripe, as a barcode, in a computer chip on the card, on a transponder on the card which on receiving a particular frequency transmits previously stored IIN and other data. The SPOS or POS devices read the IIN from a payment instrument either through direct physical contact, or by using a short-range wireless protocol; or by obtaining it from the caller's phone, or wirelessly using a long range wireless protocol, or by wire across a network or by using combinations of direct, wireless, and wired options. Where the payment is being made with a phone, a Caller ID device for the SPOS is used to securely receive the consumer's phone number, which is an alias for his IIN. The consumer on being connected then enters his PIN using his phone key pad. The merchant's SPOS device then forwards the PIN, the IIN, the merchant's MIN and the payment amount to the issuer's clearing server. The clearing server retrieves the records for that payment instrument using its IIN and then processes payment.

1. The consumer goes to a merchant store offline to make a phone purchase for a product, for example, totaling $20. The payment amount is rung up on the merchant's SPOS device. The cellular phone with which the consumer will make payment has been previously aliased to the IIN of the consumer's payment instrument (e.g., a debit card). Aliasing can be done online (i.e., on the Internet) or offline by phone.

2. The consumer opts to pay by phone.

3. The merchant's SPOS device, like a land-line or cellular phone, can send and receive phone calls, uses a Caller ID service and device to capture the phone number of a caller, and gets the PIN entered from the phone key pad of the consumer. If the SPOS device supports both phone payments and payment made in other ways (e.g., payment by debit card, by credit card, by check, by cash, by gift certificate, etc), the merchant selects "payment by phone." This selection can be made before or after the consumer calls the merchant's transaction phone number.

4. The consumer dials the merchant's transaction phone number which is the phone number of the SPOS device. On connecting he enters his PIN.

5. The SPOS device which already holds the amount for which payment is required, captures the consumer's phone number using its Caller ID device and service. It then receives the PIN entered by the consumer with his cellular phone keypad. (Each number on the phone key pad has a unique tone. The PIN entered by the consumer is received as tones which are then translated back into numbers by the SPOS device). The consumer's cellular phone number along with his PIN, the payment amount, and the merchant's MIN are then submitted by the merchant's SPOS to the issuer's clearing server.

6. The clearing server recognizes the phone number as an alias, checks its alias table, and retrieves the actual IIN and PIN of the payment instrument. It then checks to confirm that the PIN received from the merchant matches the stored PIN for that payment instrument and, if so, it uses the IIN to retrieve data for that payment instrument including available funds or credit and consumer data. The merchant may have different schemes for authenticating a PIN and may require that the PIN received by the SPOS device be encrypted before transmission. This would mean that the received PIN be first decrypted before authentication can be performed.

7. The clearing server debits (or credits) the funds or credit line available for that payment instrument with the payment amount requested, credits (or debits) the requesting merchant, updates its records for the payment instrument and thereafter sends an approval (or denial) to the merchant. The clearing server in one embodiment sends an identical approval message, as a text or voice message, to the consumer through the phone number (i.e., the alias) from which the payment was made. In another embodiment, the consumer on receiving the messages sends his own confirmation for the payment transaction using his phone key pad. Payment processing may involve download of the payment instrument from the clearing server to the merchant for local payment processing.

8. The SPOS device may then print or display the approval confirmation or denial received from the issuer. It can also, like the clearing server, send this confirmation as a text or voice message directly to the consumer's phone (i.e., the phone from which the consumer made the call). Confirmation to the consumer may be done by either the SPOS device or the clearing server. At completion of the transaction, the merchant provides the purchased good or goods to the consumer. This invention does not require that payment be made with a cellular phone but can be made with a regular telephone or any communications device that has a unique and identifiable number previously aliased to the consumer's IIN. The SPOS device of the merchant needs a method with which to identify the number for that communications device. This is achieved with the Caller ID Device for phone payments. In cases where the Caller ID function does not exist, or where the SPOS device cannot identify the consumer's phone number, then the consumer can enter both the phone number and the PIN manually using his phone key pad. This, however, is less secure as a thief who steals a PIN and knows the consumer's phone number, can call the merchant's transaction phone number and then manually enter the stolen phone number and PIN. Payment will then be processed against the payment instrument aliased to the manually entered phone number and PIN instead of against the phone number from which the payment call was made. So although phone payment can be made by manually submitting an alias and PIN to the merchant's SPOS device, it is not as secure as where the SPOS device directly receives the consumer's phone number using its Caller ID device. This also applies to payments made with communications devices other than phones.

Requiring that the SPOS device obtain the consumer's phone number only through the Caller ID function is a security feature. The consumer is required to use the phone to which his IIN was aliased, in addition to knowing the PIN, in order to make a payment. This means however that if the consumer blocks his phone number from the Caller ID or if the Caller ID service fails to identify the consumer's phone number, he would be unable to perform a phone payment. Caller ID for the SPOS device may fail with international callers where the Caller ID service is unavailable, or routing is problematic (call exchange to call exchange routing via Signaling System 7 [SS7] is unreliable for international calls). Instead of Caller ID, the merchant's SPOS device may subscribe to an automatic number identification service which always identifies the phone number and cannot be blocked. This service is currently only available for emergency services like the police, 911 emergencies and the Telcos, but may be made available for SPOS devices for payment purposes.

Payments with Non-PIN Payment Instruments

Payment instruments that do not require a PIN can have a payment transaction completed by calling the transaction phone number of the merchant using the phone to whose number the payment instrument IIN was aliased. The SPOS device then receives the phone number alias of the IIN and sends the number with a payment amount, and the merchant's MIN to the clearing server, which then processes payment, by debiting the instrument, crediting the merchant, updating its transaction records, and returning an approval or denial message to the merchant through the SPOS device, and possibly to the consumer's phone. The SPOS device may then generate a voice or text message to the consumer's phone that requires the consumer's confirmation which may function as a substitute for the consumer's signature. This is similar to making a payment with the actual physical instrument but is less secure than where the phone payment requires a PIN. This is because a consumer who loses his phone can have fraudulent payments made with it as no authentication is required. The payments will be drawn against the payment instrument to which the phone is aliased. Since using a PIN for a phone payment provides greater security, the present invention provides a method of making a phone payment with a PIN even where the underlying payment instrument itself does not require a PIN (as is the case with most credit cards). For such instruments, aliasing, which is done before phone payments can be made, is for both the IIN and the PIN and not for the IIN alone. The steps are as follows:

1. The consumer submits to the issuer's clearing server a phone number to be aliased to the IIN of a non-PIN payment instrument. An example of a non-PIN payment instrument is a credit card that requires a signature but not a PIN for payment transactions.

2. The consumer enters a PIN which may be used only for phone payments where the phone is aliased to a non-PIN payment instrument.

3. The clearing server appends the PIN to the phone number to generate a number. This composite number is the alias which is then associated with the IIN of the non-PIN payment instrument in the alias table of the clearing server database.

4. The IIN of the consumer's payment instrument is now aliased to a number which is a combination of his phone number and his PIN. The phone number alone does not exist in the alias table. The PIN may be created solely for phone payments or for all transactions with the payment instrument.

To make a phone payment for a purchase, the consumer dials the transaction number of the SPOS device and after he is connected enters his PIN using his phone key pad. The SPOS device receives the consumer's phone number using the Caller ID device and the consumer's PIN from his phone key pad. It then sends the phone number, PIN, payment amount and MIN to the issuer's clearing server. The clearing server checks for the phone number in its alias table, but does not find it since the alias in this case is the phone number plus PIN. The clearing server then appends the PIN to the phone number and then checks for this in the alias table of its clearing server database. If it finds a match, it means the alias was created for a payment instrument that does not natively require a PIN but for which a PIN was created. The clearing server then extracts the IIN, and uses it to retrieve the financial and consumer data for the payment instrument. It then debits (or credits) the payment instrument for the payment amount, credits (or debits) the merchant, updates its transaction data in its clearing server database, and sends payment approval or denial to the merchant, through his SPOS device.

The clearing server may need to perform two passes through the alias table of the clearing server database each time it receives an alias. The first pass searches for a phone number and the second pass searches for a phone number and PIN. With most modern databases this search can be performed with just one pass using wild cards. For example, if the IIN is 12345 and the PIN is 6789, then the alias is 123456789. The clearing server searches for 12345% (where "%" is the wild card). This search will return any alias that begins with 12345, and so will return 12345 or 123456789 if either exists in the alias tables of the clearing server database.

Any non-PIN payment instrument with an IIN can be configured by the issuer to require a PIN, so the method described in this embodiment is not limited to phone payments. A consumer or issuer can decide that a non-PIN payment instrument will, going forward, require a PIN. It can achieve this without making any modification to the physical payment instrument or to the merchant's POS device. The issuer either generates or obtains a PIN from the consumer. It then creates an alias for the payment instrument comprised of the IIN and PIN in its clearing server database. It also makes an entry in the IIN record for that instrument in its clearing server database that directs the clearing server to search only the alias tables for this payment instrument. This means that only aliases will be accepted for this payment instrument. So when the clearing server receives a payment request for that payment instrument it only checks its alias table and rejects the transaction if no matching alias is found. This means that the consumer must now enter the IIN and PIN for his payment instrument for offline and online payment transactions. In one embodiment aliasing for both PIN and non-PIN payment instruments is combined with other authentication schemes for more robustness. For example, the alias may be the IIN and encrypted PIN instead of IIN and PIN. This means that the SPOS device of the merchant encrypts and transmits the consumer's PIN using an encryption scheme provided by the issuer. This means that the merchant processing payment has to be approved by the issuer otherwise they would not have the encryption keys and/or encryption algorithm.

Where the consumer wants the PIN only for phone payments then the issuer on receiving a payment request from a merchant checks both the alias table and the IIN tables in its clearing server database. Phone payments always require retrieval of the payment instrument IIN from the alias tables, while payments where the payment instrument is directly read at the merchant's POS or where the consumer directly enters the payment instrument IIN will always be retrieved from the IIN table, since the merchant will send the actual IIN of the payment instrument. So a phone payment made without entering a PIN will not have an alias in the alias table since the only alias that exists for the payment instrument is formed from combining the IIN and PIN.

The method described permits the issuer to mandate the use of a PIN for offline or online payments with a non-PIN payment instrument by creating an alias. For offline transactions the consumer needs to be able to enter his PIN using the key pad of the POS device.

Remote Phone Payments

Since the SPOS device does not have to be physically close to the consumer, it means purchases can be made remotely by a consumer with a payment instrument aliased to his phone number. This creates some differences in payment processing:

1. If the merchant knows the amount to be paid by a consumer (for example, if the consumer is paying for purchases rung up on the SPOS device) the merchant can select payment by phone as the payment method, and then the consumer will only need to call the merchant's transaction phone number and enter his PIN to make payment. The merchant has the amount for which payment is required and sends this along with the consumer's phone number and PIN received by his SPOS device to the issuer's clearing server.

2. If the merchant does not know the payment amount required from the consumer then a method is required to specify the amount and any other pertinent transaction details such as the item description. The consumer may wish to make a phone payment for a remote purchase, for example, purchasing one of several possible items on television. The process is still similar to the preceding description as the consumer calls the merchant's transaction phone number—which in the above example may be displayed on Television—and then enters his PIN. In addition however the consumer has to enter the payment amount and specific item for which phone payment is being made. This is because several items may have the same price, and the merchant needs to identify the specific item to be purchased and submit to the issuer the price to be paid. Such remote purchases require that the merchant provide a way to uniquely identify each item and its price. This is achieved in one embodiment by providing item codes for each item and its price. The consumer after dialing the merchant's transaction number and entering his PIN also enters the item code for the particular item which he wants to purchase. The codes for each item will have been saved beforehand on the merchant's SPOS device.

i. When the SPOS device receives a PIN and an item code from a consumer instead of just a PIN (two inputs instead of one), it checks its list (or database) of Item Codes and is able to identify the item and its price.

ii. It then forwards the consumer's phone alias, PIN and price (obtained from resolving the item code) to the clearing server which then extracts the records for the IIN, authenticates the PIN, processes the payment, credits or debits the merchant, updates its records and sends approval or denial back to the merchant.

iii. In another embodiment, the item codes are placed on the clearing server instead of on the SPOS device. The code will then be included in the data that is sent by the merchant to the clearing server. The clearing server will then extract the item code from the information received from the SPOS device, query its database and then determine the price and description of the item. It then uses the price to process payment.

Phone Payments without a SPOS Device

A merchant with a POS device that cannot accept phone payments can be set up to do so but will require that the issuer assign a transaction phone number to that particular merchant and also provide him with a special card required to process cell phone payments on a regular POS device. A SPOS device with Caller ID device is set up by the issuer, for the merchant on whose behalf it receives consumer phone numbers and PINs. This SPOS device is called a proxy SPOS device and will have its address mapped to the merchants MIN in the SPOS-to-merchant table in the clearing server database. The phone number of the proxy SPOS device is assigned to the merchant as his transaction phone number. This is the phone number which is called by the consumer in order to make a phone payment. The merchant receives the transaction phone number from the issuer and displays it as the number to call to make a phone payment. The issuer's clearing server maps this transaction phone number to the merchant's MIN and POS address in the SPOS-to-merchant table in its clearing server database. All merchants for whom the issuer sets up a proxy SPOS device and assigns a transaction phone number are included in this table. It then sends each such merchant a special card, resembling the issuer's payment instrument, (e.g., a credit card) which is to be swiped (i.e., read) at the merchant's POS device for each transaction where the consumer opts to make a phone payment. The special card has an IIN or a segment within its IIN that tells the clearing server that payment will be by phone. Once the merchant gets a transaction phone number and the special card, he is ready to begin accepting phone payments using his POS device.

The known process for making an electronic payment purchase through a POS device is as follows. The consumer's purchases are totaled, and the consumer is asked to select a payment method. If he chooses to pay electronically, for example, by credit card, the merchant selects the credit card option on his POS device. The consumer now runs his credit card through a reader on the POS device. Information from the magnetic stripe of the credit card is then read, and along with the payment amount and merchant MIN is forwarded to the issuer's clearing server. The clearing server retrieves the IN for that payment instrument and any other required data, deducts or credits funds to the payment instrument, credits or debits the merchant, updates its records, and then sends a confirmation message back to the merchant through his POS device. The POS device may then print a receipt requiring the signature of the consumer as evidence of transaction confirmation.

The problem is that the POS device unlike the SPOS device has no option for phone payment and thus in accordance with the present invention uses a card to be swiped through it to initiate communication with the issuer. So to accept a phone payment using a POS device, the merchant still selects the "pay by credit card" option on the POS device but instead of the consumer's card, runs the special card through the POS device reader in order to accept phone payments. This is the special card sent by the issuer to merchants who wish to accept phone payments with their existing POS device. The special card has an IIN or a segment within its IIN or data in its record that tells the clearing server to expect a phone payment. Immediately before or immediately after the special card is swiped or read, the consumer is told to make his phone payment by calling the merchant's transaction phone number. The following will then occur:

1. The consumer calls the merchant's transaction phone number, and enters his PIN. The proxy SPOS device set up by the issuer obtains and transmits the consumer's phone number, PIN and its SPOS device address (associated with that merchant's MIN) to the issuer's clearing server.

2. The clearing server receives the data from the proxy SPOS device and needs to determine for which merchant payment is to be processed. So it looks up the proxy SPOS device address from which it received the data in the SPOS-to-merchant table of its clearing server database. It finds the merchant MIN to whom that proxy SPOS device is assigned. So phone payment is being made to this merchant with a payment instrument aliased to the phone number received from the proxy SPOS device. It writes the consumer phone number, PIN, merchant MIN and proxy SPOS device address to a temporary table. Each record in this table is held for a short time interval (for example, 30 seconds) following which it is deleted. Other suitably short time intervals may be employed, such as any time interval smaller than, for example, one minute, two minutes, etc. The issuer now needs to receive the payment amount from the merchant's own POS device.

3. The merchant has totaled the consumer's purchase and now swipes the special card through the POS device as if processing a credit card transaction. This initiates a transmission to the issuer's clearing server of the payment amount, merchant MIN, and IIN of the special card.

4. On receiving data from the merchant's POS, the issuer's clearing server looks up the IIN of the special card in its clearing server database which shows that payment was made by phone. So the clearing server does a lookup in the temporary table which holds data recently received from proxy SPOS devices. It searches the temporary table using the merchant's MIN and retrieves the consumer's phone number and PIN. It now has the payment amount and merchant MIN, (from the merchant's POS device) as well as the consumer phone number and PIN (from the proxy SPOS device). Between both devices it has all the data it requires to process payment. So it searches its alias tables for the consumer phone number, identifies the IIN of the payment instrument to which it is aliased, retrieves its data and can then process payment.

5. If it does not find the merchant's MIN in the temporary table it means no phone payment has been received. It waits for a short interval and then checks the table again. In that time interval the consumer may call the SPOS and submit his phone number and PIN which will be written to the temporary table and available when next it is checked by the clearing server. If no consumer phone number or PIN is retrieved after the time interval, the clearing server responds with a denial message to the merchant POS and may include an explanation such as "no phone payment received". The time interval allowed before denial is configurable and means that the consumer can make phone payment shortly before or shortly after the merchant swipes or reads the special card at his POS device.

Several illustrative embodiments exist for the method described above. In one embodiment, after the clearing server receives the consumer phone number and PIN from the proxy SPOS device, it queries the merchant's POS directly for the payment amount and PIN. A message appears on the merchant's POS such as "Hit Enter Key". Hitting the Enter key uploads to the issuer the payment amount and PIN. The issuer then retrieves from its temporary table the consumer phone number and PIN being used for payment to that merchant. It now has all the data needed to perform payment processing. Communicating with the merchant's POS and retrieving data would be feasible where the POS device has an "always on" connection to the issuer and where communication can be initiated by either the issuer or the merchant. In such cases there will be no need for a special card, since the issuer can retrieve merchant MIN and payment amounts by querying the merchant's POS. However, most of the current POS devices only allow connections to be initiated from the merchant to the issuer and have to run a payment instrument through the POS device to initiate the connection. These devices need a special card to process phone payments. Using a special card works with all POS devices to enable processing of phone payments.

In another embodiment, the merchant's MIN, and the consumer phone number and PIN received for the merchant from the proxy SPOS device are held by a separate process on the clearing server hereinafter called the Getphone process. This Getphone process maintains a record of all merchants with a proxy SPOS device who have received a consumer phone number and PIN for payment. It represents an Application Programming Interface (API) to which a merchant MIN is submitted and which then returns the consumer phone number and PIN received for that MIN from its proxy SPOS device. This means that when the clearing server receives data from the merchant's POS, it extracts the merchant MIN and submits it to the Getphone process which then returns the consumer phone number and PIN received from the proxy SPOS device for that merchant. The clearing server queries the Getphone process in short intervals and if it does not return a consumer phone number and PIN after a fixed time interval (for example, 30 seconds), the payment transaction is denied and the clearing server sends the denial message to the merchant through his POS device.

The method described for phone payments with a merchant who does not have a SPOS device also applies to an online merchant who only has a virtual POS device. This virtual POS device is usually an API provided by the issuer for submitting payment requests from a web site and receiving payment approvals or denials. For an online merchant without a SPOS device, the issuer also assigns him a proxy SPOS device and a transaction phone number. The issuer's special card is not needed for an online merchant, instead the interface where payment instrument information is submitted (e.g., The merchant's web page) is modified to include a "pay by phone" option. The online merchant submits to the issuer, his MIN, payment amount and the equivalent of a "pay by phone" marker. This marker could be a special number (e.g., 99999) submitted in place of the IIN which tells the issuer payment is being made by phone. On recognizing this marker, the issuer's clearing server queries the Getphone process by submitting to it the merchants MIN. It receives the consumer's phone number and PIN that called the transaction phone number (i.e., the proxy SPOS) assigned to that online merchant. It then retrieves from the alias table of the clearing server database, the IIN aliased to that consumer's phone number, confirms the PIN, retrieves payment instrument data and then processes payment. The online merchant may prefer to have its own SPOS device with its own transaction phone number which would function exactly like that of an offline merchant with the exception that confirmation from the issuer may need to be uploaded to the merchant's web site from his SPOS device.

For phone payments, the issuer sends confirmation to the merchant via his POS and in one embodiment sends confirmation for the payment transaction to the consumer's phone via voice or text (e.g., cell phones). So the same approval information sent to the merchant can also be sent to the consumer. Since text messaging is not possible with most regular wired telephones, the consumer may have to specify the phone type during aliasing which enables the clearing server to determine whether to send confirmations to the consumer as voice messages or text.

For assigning several phone numbers to a large number of merchants who wish to accept phone payments the clearing server in one embodiment acts as a Private Branch Exchange (PBX) that has a large block of phone numbers which it assigns to merchant's individually but which are all connected to an exchange switch which functions like a single Caller ID device and SPOS device rolled into one. Each number assigned to a merchant is equivalent to a proxy SPOS device that receives phone payments on behalf of the merchant. The clearing server is indifferent as to how the payment phone calls are received provided it can obtain the caller's phone number and PIN. It may be by wire, by satellite, as packets using the Internet Protocol (voice-over-IP), or through a dedicated radio frequency, or by a wireless protocol.

The issuer in another embodiment assigns one phone number with several extensions to a single merchant. Each extension is for a different POS device for that merchant, which for example would represent a cashier in each checkout aisle of a grocery store. Extensions may be preferred to having a completely different transaction phone number for each merchant's cashier. The consumer wishing to make a phone payment dials the merchant's transaction phone number and is prompted to enter the phone number extension for the particular cashier where the consumer is making payment before entering his PIN.

Multiple Phone Purchases

In U.S. Pat. No. 6,938,019, incorporated herein by reference, a method is described where the issuer instead of debiting the payment instrument and sending approval, sends the payment instrument record, including funds available on it, to the merchant. The merchant then applies debits or credits locally (i.e., at the POS device) to the instrument record for subsequent transactions and does not have to consult the issuer. In consequence, after submitting an IIN and PIN to download the payment instrument record, processing is very fast since each transaction is thereafter locally processed and the issuer is not contacted.

Using a phone, a consumer can make several small payments at a merchant by redialing the merchant's transaction number and entering his PIN for each purchase. Since each transaction after the payment instrument is downloaded to the merchant is processed locally, there is very little overhead, and so this embodiment enables a phone or other communications device to be used for making several very small payments, which are instantly (i.e., locally) processed with very little overhead. In another embodiment, the consumer enters his IIN and PIN at the merchant's POS device which submits it to the issuer and downloads the payment instrument record to the merchant's POS device. The merchant then gives the consumer a card with a bar code. This bar code which maps to the consumer's payment instrument and PIN is read by bar code terminals at the merchant. Each terminal forwards the bar code it reads with a payment amount to the POS device which identifies and retrieves the downloaded payment instrument record, and debits or credits it. The embodiment enables quick payments for merchants operating Game Arcades or Casinos. Each game would have a bar code terminal where the consumer enters a payment amount and "waves" (i.e., scans) his bar code card to make payment. Other embodiments could use smart cards, or infra-red transponders instead of bar codes to enable consumer payment at each terminal.

Image and Biometrics Aliasing

The IIN can be aliased to a digital image. The consumer first scans the image to be used as an alias, and then transmits this to the issuer. The issuer enters this image in the alias table of the clearing server database. The image is made an index to the payment instrument IIN to which it is aliased in the alias table. When the consumer wishes to make a purchase, he provides this image at the merchant's location. The merchant scans in the image, using a device specialized for that image type. It then transmits the image electronically to the issuer's clearing server along with other data required for payment processing. The clearing server will then search for a matching image in its alias table and if it finds one retrieves the IIN for that image. The IIN along with the other data received can then be used to process payment. This comparison and retrieval of images does not have to be performed by the clearing server itself but can be done by a third party program. The clearing server needs the payment instrument IIN to which the image is aliased (which is made the name of the image) with which it can then retrieve the records for that IIN, perform payment processing and return a response to the merchant signifying approval or denial of the payment transaction.

Neither image storage nor image matching have to be a feature of the clearing server database. Provided methods exist for storing images (of the type sent by the consumer) and identifying them uniquely, the issuer can use such methods in tandem with its clearing server database for resolving each image alias to an IIN. For example, with a third party image retrieval program that stores, transmits, matches and retrieves images, the issuer can resolve image aliases. The image could be a photograph, a fingerprint, a diagram, a retinal scan, etc. The steps would be as follows:

1. Each image alias sent by a consumer to the issuer is stored by the imaging program. In the illustrative embodiment described herein the image is named "IIN". That is, it is given the name of the IIN of the payment instrument being aliased. This is conceptually akin to creating an alias table in the clearing server database that has the image alias as a unique Index that points to the IIN.

2. When the consumer wishes to make a purchase using only the alias as authorization, he presents the image at the merchant's Point-of-Sale. The image may actually be a photograph that the consumer carries around and uses for payment or it may be an image that has to be generated and transmitted at the merchant's location such as a fingerprint.

3. The merchant then scans in the image, using a specialized device which generates an image and prepares it for electronic transmission usually by digitizing it. The image scanning and transmission process may already be integrated into the merchant's POS device or may be performed by a separate device linked to his POS device. In the latter case, the image scanning device transmits the image to the POS, which in turn, bundles this image, with a payment amount, and the merchant's identification number and sends this to the issuer.

4. The issuer on receiving the image, recognizes it as an image alias and then forwards this to the imaging program. The imaging retrieval program then scans its repository of images using its imaging matching methods, which may be opaque to the issuer, to identify a matching image and produce its name. Since the name is "IIN", the issuer's clearing server will now use the image name (same as the IIN) to retrieve payment instrument data from its clearing server database.

5. If the imaging retrieval program cannot find a matching image in its database it does not output a name which means the image submitted does not match any originally submitted by the consumer as an alias. The clearing server cannot resolve the alias and therefore cannot process payment, so it sends an error message back to the merchant through his POS or SPOS device.

The image in the above example could be a photograph, a fingerprint, a retinal scan or biometric data such as a fingerprint. In fact aliasing can be performed for any kind of data or data set for which methods exist for:

1. Uniquely identifying the data.
2. Transmitting the data to the issuer electronically, usually by digitizing it.
3. Naming and storing each piece data.
4. Comparing and identifying matching data.
5. Retrieving each piece of data from a group of data sets.

These methods can be contained in a computer program or process which can then run in tandem with the clearing server database for performing aliasing and making electronic payments. For example, where there is a method for uniquely identifying human aromas, capturing and electronically transmitting each aroma, naming and storing each aroma, comparing and identifying matching aromas, and retrieving a single aroma from a set of stored aromas, then the human aroma can be used as an alias and therefore as a biometric payment method.

First, the consumer's aroma is collected, digitized and electronically transmitted to the clearing server. The clearing server transfers the aroma data to the aroma program which stores it in its aroma database and names the specific aroma the IIN of the consumer's payment instrument. Each aroma is named the IIN to which it is aliased. The consumer then specifies whether he will use only his aroma (i.e., the alias) or the aroma along with his payment instrument to make payments.

To make a purchase using his aroma, the consumer's aroma is collected at the merchant's Point-of-Sale, converted to a form in which it can be electronically transmitted and then sent to the clearing server along with the payment amount and the merchant's MIN. The device needed to collect, store and transmit the aroma may be integrated with or separate but attached to the merchant's POS device. The clearing server receives the aroma data and hands it to the aroma program which searches its database of stored aromas and determines if any exists which match the aroma received from the consumer. If it finds a match, the aroma retrieval program retrieves it and passes its name (i.e., IIN) to the clearing server. The clearing server then retrieves the data for that IIN from its clearing server database and can then process payment. The same process can be used for aliasing a fingerprint, or a retinal scan or other biometric data.

The consumer after creating an alias can specify that both the IIN and the alias be required for a payment transaction, as this would provide higher security than using the IIN alone. An example would be creating a fingerprint alias for a payment instrument which requires a PIN, such as a debit card. To make a payment, the consumer's debit card is read by the POS device, the consumer enters his PIN, and then scans his fingerprint at the merchant's POS device. The combination of IIN, digitized fingerprint data and PIN would then be sent to the issuer's clearing server. The clearing server then hands the IIN and image to the fingerprint retrieval program. The program retrieves a matching fingerprint image from its database and compares its name with the IIN to see if it matches. Alternatively it may use the IIN to retrieve a fingerprint image from its data base and compare this image with that received from the merchant to see if they match. In either case a match means that the correct IIN and fingerprint were submitted by the consumer, the clearing server then retrieves the payment instrument data for that IIN and is able to process payment.

The method in this embodiment applies to all payments requiring a payment instrument and any kind of image or biometric data. The image or biometric data is transmitted beforehand to the clearing server and aliased to the IIN of a payment instrument.

For example in an illustrative embodiment, a consumer pays a merchant using only the fingerprint from his right index finger. The following steps will be required:

1. The consumer first purchases a payment instrument which has an IIN and PIN. The customer then submits the fingerprint of his right index finger to the fingerprint recognition software connected to the clearing server.

2. This fingerprint data is then stored as a record by the fingerprint retrieval program.

3. This fingerprint data is then aliased to the payment instrument IIN stored on the clearing server. The process by which the fingerprint is compared with, and matched with other fingerprints within the fingerprint identification program can be completely opaque to the clearing server. The fingerprint image (i.e., the alias) is linked to the payment instrument by naming it the IIN. Any fingerprint in the database of the fingerprint identification software is given the same name as the IIN to which it is aliased.

4. When a fingerprint is entered at the point of sale, the fingerprint data is scanned and converted to a form in which it can be transmitted. It is then forwarded, along with the merchant's MIN and payment amount, to the issuer's clearing server.

5. The fingerprint identification program at the issuer now determines if this fingerprint data matches any in its database using its own internal algorithms. If it does, it extracts the matching image. Its name is the IIN of the payment instrument to which it is aliased. This IIN is then handed to the clearing server which retrieves the IIN data, processes payment and returns the results to the merchant.

The embodiment where payment requires both the payment instrument e.g., a credit card, and a fingerprint provides increased security as the card cannot be used if it is stolen. The fraudster must produce a fingerprint. Fingerprint matching in one embodiment is done on the payment instrument itself (i.e., the card) and where there is a match then the consumer's IIN and PIN are transmitted from the card to the POS device. The card has a computer chip, memory, and storage where the issuer loads a copy of the consumer's fingerprint obtained during registration or during aliasing. Each time the consumer uses his card for a payment his fingerprint is first read through a window on the card and compared with the stored image before a payment transaction can proceed. Cards which automatically transmit IIN (and PIN) data to a POS device using a short range wireless protocol are convenient but insecure as they can be used by anyone if it is lost or stolen. Using biometric data as described in this embodiment increases security for such instruments.

Using a Communications Device with Biometric Data to Make Payment

Another embodiment of the present invention uses biometric data and a communications device (e.g., a phone with a fingerprint) to make payment. The consumer first aliases his phone to his payment instrument. He then sends a fingerprint image to the issuer which is aliased to the same payment instrument. To make a payment using his phone and his fingerprint, the consumer calls the merchant's transaction number, enters his PIN and submits his fingerprint. The fingerprint can be submitted at the merchant's POS device, which means that the consumer has to be physically present at the merchant's location, or his agent's location. It can also be sent by the consumer himself if he has a device that scans and transmits his fingerprint to the merchant's SPOS device. The SPOS device in the latter case will need to be able to receive the scanned fingerprint data by phone or wirelessly. Since many cell phones come with digital cameras, the consumer in another embodiment, photographs and transmits various kinds of biometric data, such as a fingerprint image, to the merchant along with or in place of his IIN and PIN without being physically present at the merchant's location. In either case, the fingerprint data, the consumer's phone number and PIN and the merchant's MIN are submitted by the merchant to the clearing server. The clearing server resolves the phone alias; obtains an IIN; confirms that the PIN for the associated payment instrument matches the PIN for the consumer, and then hands the IIN and fingerprint image to the fingerprint retrieval program. The program finds an image and IIN match and informs the clearing server which can then retrieve payment instrument data for that IIN and then process payments.

The consumer may also specify that only the alias be used for transactions and that the IIN should not be used. In this embodiment, the clearing server only searches the alias table in its database when it receives data from the merchant. If the alias for the instrument is not found in the table the payment transaction is denied. This is the default when the alias received is not numeric because the clearing server will not check its IIN tables for a non-numeric alias. Accepting only an alias for payment is useful in cases where the alias because it is unique and very difficult to duplicate, offers greater security for making payments. Another illustrative embodiment is where a consumer aliases his voice to his IIN and the uses his voice which is scanned at the merchant's point of sale to make payment. The voice is recorded digitized and transmitted along with the payment amount and merchant MIN to the clearing server. At the clearing server the voice data received is compared with existing voice data in the voice database of the voice program. If a matching voice is found, the IIN to which it is aliased is obtained, and the data for the payment instrument with that IIN is then retrieved from the clearing server database and payment is then processed.

An alias including a biometric alias such as a fingerprint may be submitted along with a PIN. The payment method is again similar except that after the payment instrument IIN is obtained from the alias, its stored PIN is retrieved and compared with the PIN submitted by the merchant. If they match then payment processing proceeds, if not the payment is denied and a message is sent to the merchant through his POS or SPOS device.

Aliasing therefore enables the clearing server to use plug-ins or auxiliary programs. These auxiliary programs will be able to store, transmit, compare, match and retrieve visual, audio, biometric or various kinds of non-alphanumeric data. Aliasing therefore allows as yet undeveloped comparison and retrieval inventions to be used to make payments. This could include voice, face, odor, hair, human aura recognition inventions.

Money Transfer Payments by Phone.

The issuer, because it holds records for all the instruments it issues, can debit one payment instrument and credit another payment instrument for the same amount. This amounts to a money transfer between payment instruments or a transfer of funds from one consumer to another. A money transfer requires that the consumer transferring the funds from his payment instrument (hereinafter called the transferor) to the payment instrument of another recipient (hereinafter called the recipient) contact the clearing server or its representative to perform the transfer. This process can be performed by phone using the methods described earlier for phone aliasing. The illustrative embodiments described below for money transfers use a stored-value PIN payment instrument. The method for performing money transfers online is first described before that for money transfers by phone.

Transfers Between Instruments of the Same Issuer

To perform a money transfer online between payment instruments issued by the same issuer, the transferor performs the following steps:

1. The transferor connects to the issuer's web site and submits his payment instrument IIN, PIN, transfer amount, and recipient's payment instrument IIN.

2. The issuer's clearing server authenticates the transferor's IIN and PIN, retrieves data for the payment instrument with that IIN, debits it, updates its transaction history, and sends a message to the transferor.

3. It then retrieves data for the recipient's payment instrument using its IIN, credits it, updates its transaction history, and then sends a message to the recipient confirming the transfer amount received, and the IIN or alias of the transferor. Credit to the recipient does not require his PIN.

To perform the above transactions by phone, the payment instrument of the transferor is first aliased to his phone number. The issuer provides a phone number, hereinafter called the money transfer phone number, which the consumer calls to perform a money transfer. This is actually the phone number of a SPOS device which has a Caller ID device and forwards all data received for a money transfer to the clearing server i.e., the transferor IIN or alias, PIN, transfer amount, recipient IIN or alias, and any other data. This means that the SPOS device for performing money transfers can be operated either by the issuer or his agent. This phone number does not have to be used only for money transfers but could be the number called by the consumer for performing all phone transactions at the issuer, including aliasing, unaliasing, money transfers, one-time PIN generation etc. The consumer calls, selects his choice from a menu and then enters his PIN and then steps through and provides all other information required for that particular transaction. The issuer may also choose to have consumers call dedicated numbers for each type of phone transaction e.g., a money transfer phone number, an alias phone number.

1. The transferor calls the issuer's money transfer phone number

2. Once connected he follows automated voice prompts and using his phone keypad enters his PIN, the transfer amount, and the recipient IIN. If the recipient's payment instrument IIN is aliased to a phone number, he enters the phone number instead of the IIN.

3. The issuer's SPOS devices receives the consumer's phone number, PIN, transfer amount and recipient's payment instrument IIN and transmits this to the clearing server 4. The clearing server resolves the transferor's phone number alias, obtains the IIN, retrieves the payment instrument data, validates its PIN, debits its funds, credits the IIN provided for the recipient, updates the transaction history, and sends transaction confirmation information to the transferor's phone using either voice or text messaging. The confirmation information includes the money transfer amount, the recipients IIN, the date and time of the transfer. It may also include a transaction number for reference purposes.

5. If a phone number was given for the recipient, the clearing server resolves the recipient's phone number alias to obtain his payment instrument IIN. It then uses the IIN to retrieve payment instrument data, credit the funds to the payment instrument, update its transaction history and send a message either to the recipient's phone, or by email to the recipients email address, stating the funds received, its IIN source and the date. For transfers by phone, the source includes the transferor's phone number and/or name. For transfers performed online the transferor can give the recipient's email address instead of his phone number and the transfer will be performed using the same method. Transfers performed online can be made to any recipient alias (e.g., email, phone, or image alias).

6. Where the consumer transferor specifies a phone number for a recipient who has no payment instrument. The clearing server generates a payment instrument with an IIN and PIN, and then aliases this payment instrument to the phone number provided for the recipient by the transferor. On debiting the transferor and crediting the recipient, it sends a message to the recipient's phone number confirming the funds received on his instrument as well as the PIN with which to make payments or retrieve cash from the payment instrument. In another embodiment, the clearing server may send the PIN for the new payment instrument only to the transferor (and not to the recipient) in its transaction confirmation message. The transferor in this case would have to communicate the PIN to the consumer recipient.

7. The recipient who already has a payment instrument will see increased funds in his payment instrument all of which is immediately available for making payments. The consumer recipient for whom a new instrument was generated may need to get the PIN from the transferor before he can begin performing payment transactions. He may also be required to provide personal information before the payment instrument can be used for payment (i.e., activated).

Money Transfers by Phone

A money transfer by phone requires first creating a phone alias for the transferor's existing payment instrument. Where the funds are being transferred to a recipient with a phone but no payment instrument, a payment instrument is generated for the recipient that receives the funds transferred to him. This new instrument is then aliased to the recipient's phone number provided by the transferor. This process of generating an instrument for a recipient who does not already have an instrument and then aliasing to a phone number provided by the transferor enables funds to be transferred to an email address, or to a phone number or to an image. The transferor will need to submit the alias (i.e., the email or phone number, or image) along with the transfer amount, his IIN, PIN and any other data to the issuer. A payment instrument is then generated for the recipient with a PIN and an IIN. The payment instrument is then aliased to the email address or phone number or image provided by the transferor. The recipient will need to submit this alias and the PIN in order to make payments with the payment instrument.

Money Transfers Between Payment Instruments of Different Issuers

Money transfers between payment instruments from different issuers require the IIN and PIN for both the payment instruments of the transferor and that of the recipient presented to a merchant intermediary that accepts the payment instruments of both issuers or to an issuer who accepts the payment instrument of the other issuer.

In the case of a money transfer from a bank account to a payment instrument, which is a known method used to "refill" the payment instrument, the consumer provides to the issuer the details of the transferor's bank account. This includes his bank routing number, and the checking account number, as well as the payment instrument IIN and PIN of the recipient's payment instrument. The issuer then debits the bank account using the electronic funds transfer networks and credits its own payment instrument with its usual methods. This is the same process used to initially fund a stored-value card from a bank account. The reverse process transfers funds from the payment instrument to the bank account. Instead of a bank account, the transferor or recipient instrument could be the payment instrument of another issuer such as a credit or debit card in which case the IIN and PIN at a minimum are required to make a payment from that instrument.

Drawing Cash from an ATM with the Card of a Non-Network Issuer

Funds are drawn from an ATM (Automatic Teller Machine) attached to a network when a request for cash from a payment instrument is received and routed through a gateway to the issuer of that payment instrument. The gateway, called the host processor, is connected to each member of the network. The issuer approves or denies the payment request, and the approval (or denial) is sent again through the gateway back to the ATM machine which then disburses cash from the payment instrument or displays a balance or credits the payment instrument. The ATM is like a specialized POS device since it reads the payment instrument; identifies the issuer; and then submits the IIN, PIN, payment amount to the issuer. It then receives an approval or denial of the payment request. Unlike an ordinary POS device, on receiving payment approval for a payment request, it mechanically pays out the payment amount for which approval was received. It can also request specific actions, called action requests, such as display the instrument balance, or lock payment instrument, or accept a cash deposit. It therefore needs a display, a key pad or device for input, a mechanism for disbursing and receiving cash, and processes for recording and printing each payment transaction.

In this invention, drawing funds as cash from a payment instrument (one type of financial transaction) however only requires an offline merchant. The method is exactly like making a purchase from a merchant using a payment instrument, except that the merchant is selling cash. To draw cash from his payment instrument, the consumer goes to a cash-disbursing merchant and selects an amount to purchase, for example, $50. The consumer runs his payment instrument through the merchant's POS device and enters his PIN (if applicable). The merchant contacts the issuer, submits the data from payment instrument, PIN and payment amount, receives payment confirmation, and then releases the purchased item which in this case is the $50. So the consumer's payment instrument has been debited by $50 and the merchant receives $50 from the issuer. The merchant and/or issuer may include fees for the cash-disbursement service. The merchants POS device may be designed to mechanically pay out the cash "purchased" and so function like an Automatic Teller Machine.

Drawing Cash from an ATM attached to an Alien Electronic Payment Network

This invention describes below a separate method which enables an issuer to have an independent agreement with an individual member of an electronic payment network, to which the issuer does not belong, that will enable its payment instrument to be accepted in that network for all payment transactions including drawing cash from that network's ATM or making purchases at merchants whose POS devices are connected to that network. The member of the network with whom the issuer has an agreement needs to be approved to accept the issuer's payment instrument. This means, for example, that if Bank X, a member of the KASH electronic payment network, accepts the payment instrument of an issuer then that issuer's payment instrument can be used to draw cash, for example, at an ATM connected to a KASH network. The method for doing this is as follows:

1. Bank X belongs to KASH network, a 50 member network to which Automatic Teller Machines (ATM) are attached. Each member's payment instrument can be used to draw cash at KASH ATMs. This is an alien network to an issuer who is not a member of the network.

2. Bank X accepts the payment instrument of an issuer who does not belong to the KASH network. This issuer is called the non-network issuer and Bank X its network partner.

3. The non-network issuer wants its payment instruments to be usable in the KASH network, for example, for drawing cash at ATMs for the KASH network.

4. The ATM for the KASH network works like a regular ATM. It reads the IIN of any payment instrument and determines if the card was issued by a member of its network and which one of its 50 members issued the card. Identification of the member-issuer may be performed instead by the gateway. The ATM then routes the IIN, PIN, and consumer data, read from the card and the payment amount or action request entered by the consumer to the network gateway. The gateway then sends the data received to the network member who issued the card. The network member validates the data received, debits the payment instrument and credits the merchant (i.e., the ATM owner) or performs an action (such as finding the outstanding balance on the payment instrument). It then sends a confirmation message or action result through the gateway to the ATM. On receiving the approval message the ATM disburses cash to the consumer or displays the result of the requested action such as displaying the payment instrument balance or confirming a cash deposit or locking the payment instrument (i.e., preventing further transactions with the payment instrument).

5. In this invention, in order to use its payment instrument in an alien network, for example, at KASH network ATMs, the non-network issuer first obtains from Bank X, its network partner, authorization to generate the IIN for its payment instruments in such a way that it appears to the KASH network (including its ATMs, gateway, and POS devices) as if Bank X, the network partner, is the payment instrument issuer. This means any payment or action requests on that payment instrument originating from within the KASH network will be sent to Bank X, the network partner. Bank X will then forward the data received to the non-network issuer, who then processes the payment request or action and sends confirmation back to its network partner. For debits of its payment instrument, it credits its network partner and for credits of its payment instrument it receives credit from the network partner. Where action requests are received, the action is performed and confirmation along with any action result is sent to the network partner. Payment approval or action confirmation is then forwarded from the network partner to the KASH network gateway from where it is then forwarded to the device from which the request originated within the KASH network, which in this case is the ATM.

6. The KASH network identifies its payment instruments with the first digit of the IIN and uses the next two digits to identify each of its network members. Those two digits are therefore unique for each network member but the first digit is always the same. The remainder of the IIN can represent payment instrument and consumer data. For example, the KASH network payment instruments always begin with 9 and Bank X is assigned the number 48 so that the first 3 letters of its payment instrument IINs always begin with 948. The IIN formatting requirements for the payment instruments of an electronic payment network are standard and used for payment processing. These formatting requirements differ from one network to another.

7. The non-network issuer creates cards using IINs generated for it by the network partner. These IINs conform to the formatting scheme required by the KASH network and will have a segment representing account numbers of the network issuer. In this illustrative example, it issues cards beginning with the number 948, i.e., the network number and the two digit number for Bank X, the network partner. Digits 4 to 8 of the IIN represent account numbers for the non-network issuer's cards. The non-network issuer aliases each of these IINs to the actual IINs for its payment instruments, new or existing. Its existing payment instruments will work on its own network but not on the KASH network as the IIN on the magnetic stripes of the existing instruments do not match the IIN format for the alien network. Newly issued cards with KASH network IINs embossed both visibly and on their magstripes can be used for payment both with approved merchants of the non-issuer and in the KASH network including but not limited to drawing cash from KASH ATMs.

8. A consumer with the new card of the non-network issuer's goes to a KASH network ATM to draw cash. He inserts his payment instrument into the ATM and enters his PIN and the payment amount to be drawn. The IIN and any consumer data are read from the card which along with the PIN and the payment amount input by the consumer is forwarded to the KASH network gateway. The third and fourth digits of the IIN point to Bank X as the issuer, so the gateway forwards the data to Bank X, the network partner of the non-network issuer. Bank X from segments of the IIN (Digits 4 to 8) identifies the payment instrument as belonging to the non-network issuer and forwards the IIN, PIN, his MIN, payment amount or action required, to the non-network issuer. The non-network issuer receives the information as if from a POS device, resolves the IIN which is an alias to the real IIN, processes payment, credits or debits the network partner, and sends approval back to its network partner, Bank X.

9. Bank X forwards the payment approval back to the KASH network gateway which in turn sends it to the device that originated the request on its network, which in this case is the ATM machine. The ATM then disburses the funds drawn on the non-network issuer's payment instrument or displays the result of an action request such as printing the card balance.

10. Neither the devices on the KASH network nor any other KASH network members need to participate when processing payments for these new cards of the non-network issuer. All that is required is agreement with a member of the KASH network, Bank X, who is or becomes a merchant of the non-network issuer.

The method described for processing payments for a non-network issuer's payment instrument through an alien electronic payment network requires generating the IIN for the payment instrument so that it is accepted by that network as coming from one of its own network members. The non-network issuer does not belong to the alien network but can process payments through a member of the network referred to as the issuer's network partner. For processing in an alien network the non-network issuer should satisfy two requirements:

1. It generates the IIN for its payment instrument using the scheme followed by the alien network and identifies its network partner as the issuer of its payment instrument. All payment requests for that payment instrument originating in the alien network are therefore routed to its network partner (i.e., a member of the alien network, equivalent to the Bank X in the illustrative embodiment described earlier).

2. The data read from the payment instrument while conforming to the format of the alien network and pointing to the network partner as issuer, should still retain all the information which the non-network issuer (the actual issuer) requires to identify its payment instruments and process payment. For example, if the network partner allocates only 5 digits in its IIN for identifying payment instruments of the non-network issuer then the non-network issuer can only create 100,000 cards. If it wants more cards than this, then it needs a way to include more information on the card.

There are several methods for meeting these requirements in the present invention but three illustrative embodiments are given below:

a. Payment instruments used in ATM networks have a magnetic stripe. Information on the magnetic stripe is written in three tracks, each of which is 0.11 inches wide. Track one, track two and track three each hold 79, 40 and 107 alphanumeric characters respectively. Even though data is read and transmitted from all three tracks, only data on tracks one and two follow ISO/IEC standard used by banks while data on track three varies from bank to bank and generally includes additional instrument data such as the PIN, country code currency units and card limit. Tracks one and two can hold the IIN and consumer data generated by the network partner, such that it meets any format requirements of the alien network and points to the network partner as the payment instrument issuer. Tracks one and two each have room for a primary account number up to 19 characters per track amounting to 38 characters in all. The actual IINs of the non-issuer's Instruments can be written to these tracks. In addition both tracks have room for discretionary data i.e., data required to fill up each track after the issuer has written all required data. Both the IIN and data generated by the network partner and the actual IIN and data required by the non-network issuer can fit on tracks one and two. The entire third track may also be used to write the actual IIN and all the payment instrument data for the non-network issuer's payment instrument since the additional instrument data usually stored on it is not relevant for a "foreign" payment instrument (i.e., the payment instrument of the non-network issuer). This track however is read/write and if the devices for the alien network such as ATM or POS devices write to it then permanent instrument data cannot be stored on that track. If the actual IIN of the non-network issuer is stored on the magnetic stripe then the IIN generated by the network partner can include a segment with one dummy account. This account which can be the same for all cards identifies the card as that of the non-network issuer. When data from the payment instrument magnetic stripe is read and sent to the network partner, it reads the dummy account segment of the IIN, and recognizes it as belonging to a payment instrument from the non-network issuer. It then sends to the non-network issuer data for its payment instrument, including the IIN, received from the relevant tracks (or track) of the magnetic stripe. It also includes in the data sent, the PIN received from the consumer, and the payment amount. Using this method the non-network issuer does not need to use aliasing as he receives from the network partner the actual IIN for his payment instrument. The data sent to the network partner may be to perform an action not a payment transaction. Where the data received includes an action request, the network partner first translates the action requested into an action code that will be recognized by the non-network issuer and includes this code in the data sent to the non-network issuer. The software and/or hardware received by approved merchants of the non-network issuer (which include the network partner) have the action codes for each action request although the merchant also receives a hard copy for manual processing. The network partner may need to translate action requests (such as display the payment instrument balance) for which it may have its own codes into the action codes of the non-network issuer for those action requests.

b. The network partner if he uses aliasing generates an IIN for the payment instrument of the non-network issuer but makes this an alias for the actual IIN of that payment instrument. So when it receives a payment request for a payment instrument, it searches its alias table for the IIN it generated for the payment instrument of the non-network issuer, and if it finds it, retrieves the actual IIN for that payment instrument. It then forwards this with the PIN, his MIN, payment amount or action request to the non-network issuer for processing.

c. The network partner may maintain a table that maps specific segments of the IIN it generates for the non-network issuer's payment instrument to the actual IIN for that payment instrument generated by the non-network issuer.

The method described can be used not just to draw cash from the ATM of an alien electronic payment network but to perform any payment transaction permitted in that network. This means that that the payment instrument of a non-network issuer can be used for purchases in the alien network. The steps are as follows:

1. Instead of an ATM, the payment instrument (the card) of the non-network issuer is used to make payment at a merchant whose POS device is attached to the alien network.

2. Data is read of the card, and sent with the PIN, payment amount and merchant MIN to a gateway for the alien network. The transmission may be directly to the gateway or indirectly through intermediaries.

3. The alien network gateway using the information from the IIN, identifies the presumed issuer (i.e., the network partner) and forwards the data from the card to him.

4. The network partner, receives the data, recognizes the payment instrument as belonging to the non-network issuer and forwards the payment request with the data, including, its own MIN and the actual IIN of the card to the non-network issuer.

5. The non-network issuer processes payment, credits or debits the network partner and sends back approval.

6. The network partner in turn, credits the merchant, and sends its approval to the gateway which then sends information to the merchant confirming payment receipt from the consumer. For a purchase transaction the merchant can then release the purchased items.

The non-network issuer can issue cards that have their actual IINs visibly embossed on the card but which have both the IINs generated by the network partner and their actual IINs on the magnetic stripe. This card is accepted for payment in the alien network but only offline where the card IIN data is read from the magnetic stripe. Online where the IIN is read off the card by the consumer and entered into the merchant's site for payment transactions, only the non-network issuer's merchants can accept that payment instrument. Both its own merchants and the alien network merchants accept the card offline since its magnetic stripe has the network partner's IIN as well as the non-network issuer's IIN. For a payment to a merchant of the non-network issuer, the data on the magnetic stripe of the card is read. If this merchant accepts payments only from the non-network issuer, it forwards this with other payment data directly to the issuer. The issuer then uses either the network partner's IIN (or the actual IIN) to retrieve the payment instrument records and process payment. Where this merchant also accepts payment from the alien network, it uses the IIN from the magnetic stripe to identify the network and the presumed issuer, the network partner. It then sends this with other payment data to the network partner. The network partner in turn recognizes the instrument as belonging to the non-network issuer and forwards the data to it for payment processing. The card therefore allows offline payment transactions with the merchants of the non-network issuer and the merchants of the alien network. It allows cash to be drawn from ATM's of the alien network, but only allows online transactions with merchants of the non-network issuer.

Making Payments to Multiple Networks

Where an issuer belongs to an electronic payment network or has its payment instrument accepted in such a network through a network partner, then the IIN for its payment instruments meets the IIN formatting requirements for that network. Its payment instruments will be accepted for payment in one or more other networks provided those other networks (i.e., their POS devices, merchants, issuers) can identify the issuer (or network partner) and his network and forward payment data to it. The network and issuer information is obtained from the IIN of the payment instrument. For example, two networks 1 and network 2, have members who issue payment instruments with IINs beginning with 1 and 2 as identifiers for their respective networks. Payments made in network 1 with an instrument IIN beginning with 1 will be processed within network 1, i.e., data is forwarded to the gateway for network 1 and then to the issuer who is a member of network 1. If the payment instrument IIN begins with 2, the payment data will be forwarded from network 1 to the gateway for network 2 from there to the issuer who belongs to network 2.

Where the issuer wants his instrument to be accepted at two or more networks where each network recognizes only its own payment instrument, it faces a problem as the IIN scheme for payment instruments of one network is invariably different from those of another network. In particular the format for identifying payment instruments issued by members of each network may make it impossible to generate a payment instrument IIN that satisfies the format for both networks. The method described below permits an issuer who has two network partners in two logically separate networks to use one payment instrument for payment transactions on both networks:

1. The non-network issuer has network partner 1 for electronic payment network 1 (network 1) and network partner 2 for electronic payment network 2 (network 2)

2. Network partner 1 generates the IIN and other payment instrument data specific to network 1 which is written to the magnetic stripe at the back of the card issued by the non-network issuer. The magnetic stripe is positioned at the back of the card 0.223 inches from the top edge as specified by ISO 7811-4. This is called the top magstripe.

3. Network partner 2 generates the IIN and other payment instrument data specific to network 2 which is written to a second magnetic stripe at the back of the card issued by the non-network issuer. The second magnetic stripe is at the back of the card 0.223 inches from the bottom edge. This is the bottom magstripe. It meets the ISO 7811-4 standard if the back of the card is turned upside down before it is swiped at the POS device.

Figure 3:
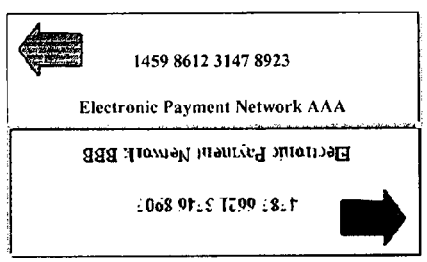
FIG. 3 shows two illustrative cards with multiple magnetic stripes that may be employed in accordance with the present invention.
Figure 3:
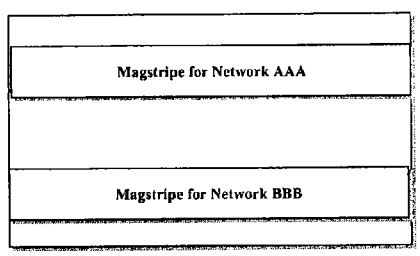
Figure 3:
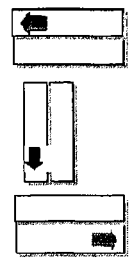
Figure 3:
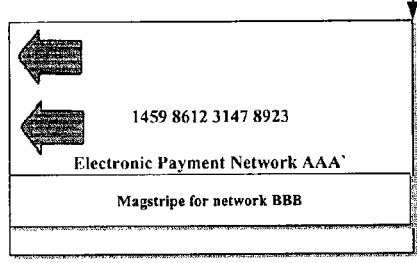
Figure 3:
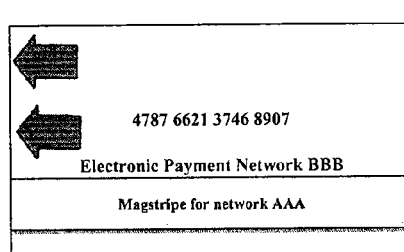
Figure 3:

4. Purchases from network 1 read the top magstripe which has data for that network while purchases from network 2 read the bottom magstripe which has information for network 2. Logos and arrows in the front of the card prompt the consumer or merchant as to how to rotate the card so that the appropriate magstripe for a particular network can be read by the POS device. FIG. 3 shows the design and use of a card with 2 magstripes.

5. Magstripes do not have to be limited to the top and bottom half of the back of the card but can also be on the top and bottom half of the front of the card. The magstripes in front of the card also need to be 0.223 inches from the top and 0.223 inches from the bottom. A card with 4 magstripes can therefore be used for payment at 4 different logically separate electronic payment networks.

6. Magstripes, each representing information for a different electronic payment network, can be physically rotated into place 0.223 inches from the top of a specially designed card so it can be read by a POS device. The card design allows each magstripe to be associated with a named network as shown in FIG. 3.

Merchant Accepting Phone Payment Instruments from More than One Network

It is known that merchants can configure their POS devices to accept payment instruments from issuers belonging to different networks. Payment data is either sent directly to the issuer using information from the IIN, or sent to a gateway for that network, which identifies the issuer for that payment instrument and forwards the data to the issuer. The network and its gateway also are identified from the payment instrument IIN, usually the first digit.

In the present invention, for phone payments for an instrument issued by a network the merchant forwards the consumer's phone number to a gateway which reads a shared alias database, identifies the issuer from the consumer's phone number, and sends that information back to the POS device which then forwards the payment information to the issuer. In another embodiment the merchant sends all the payment data to the gateway which identifies the issuer and forwards the data to it.

Where the merchant accepts phone payment for payment instruments from more than one network, it has to identify the network, which in turn tells it the gateway to which to forward phone payment data. In one embodiment of the present invention the consumer is required to enter his PIN and then is prompted to enter a network number. In another embodiment, the PIN selected or generated by the consumer begins with a digit that identifies the network. In this embodiment, the consumer selects a PIN, for which the issuer supplies the first digit representing its network. Where the issuer chooses to generate the PIN it also begins with a digit that identifies its network. So using the first letter of the PIN the POS forwards all payment data to the appropriate gateway or identifies the issuer from the gateway and then sends the payment data to it directly.

"Loading" a Phone with Funds Directly

A consumer who wants to make an electronic payment or transfer funds but has no payment instrument can purchase a payment instrument such as a stored-value card offline and then alias the card to his phone. He can then use his phone either to make a payment or to perform a money transfer. The aliasing can be done either online or through the phone (both methods are described above). The stored-value card is usually sold by a merchant and can be offered in a number of forms:

1. The merchant buys from the issuer a stored-value card with an IIN for which a record already exists in the issuer's database. This card is active and comes with an IIN embossed on it, a magnetic strip holding the IIN, a stated amount of cash also embossed on it, and a PIN which is uncovered by the consumer after the card purchase (e.g., The PIN is hidden and scratched off after the consumer purchases the card). The consumer can then use the card for payments offline and online. For offline payment, the POS device of an offline merchant reads the IIN from the magstripe, reads the PIN from the keypad and forwards this with the merchant's MIN and payment amount to the issuer. For online payments, the consumer connects to the merchant (e.g., to his Web Site), selects a payment amount to be made (usually for a purchase) and makes payment by entering his IIN and PIN. Payment is processed as if the IIN, PIN and payment amount were obtained from a POS device.

2. Instead of having a scratch off PIN as described above, a PIN is not created for the card. If this is a PIN payment instrument then it is inactive and activation will require that the consumer set a PIN for the payment instrument either online or using a modified POS device. For this the stored-value card is run through the Merchant's POS device, the consumer enters a PIN using the POS keypad. The IIN, PIN, MIN, a zero payment amount and an action code, is sent to the issuer. The zero payment amount means an action is required and the action code gives the action as, setting the PIN. The issuer now saves the PIN received in its clearing server database as the PIN for the payment instrument. Since the payment instrument already has funds, the amount of which is embossed on it, it is now ready for use. To perform an action request online, the merchant connects to the issuer's web site and submits the same information: IIN, PIN, MIN, a zero payment amount and an action code. The issuer updates the PIN and displays confirmation.

3. The merchant has an "empty" stored-value card (i.e., a physical card with an IIN but no funds in it). Empty stored-value cards are of two types:

a. A Physical card with an IIN that has a payment instrument record in the clearing server database but no funds in it and no PIN which if it is a PIN payment instrument means it has not been activated. This is a Record Present Empty Card (RPEC).

b. A Physical card with an IIN but no payment instrument record in the clearing server database. The IIN for this kind of card is generated by the clearing server solely to be embossed on the card and on its magnetic stripe using its usual IIN generation algorithm. This IIN is not assigned to any other card. This is a Record Absent Empty card (RAEC).

The RPEC is used where a consumer wishes to purchase a stored-value card for an arbitrary amount (for example, $300). He pays the merchant this amount plus any fees. The consumer sets the PIN on the RPEC (which activates the card) and then the merchant transfers funds to the card from his account or from a payment instrument issued by the same issuer of the stored-value card. He connects to the issuer's site, gives the transferor instrument and PIN and for the recipient gives the IIN of the just activated RPEC. The transfer amount is the cash paid by the consumer less any fees. The funds are transferred and the RPEC is now active has a PIN and is ready for use.

RAEC are used for drawing cash from ATMs. The card has an IIN generated by the issuer embossed on it but the IIN on the magstripe is issued by network partner of the issuer. To draw funds from an ATM, the consumer transfers funds into this card by giving the IIN embossed on the card as the recipient instrument. The issuer generates a new IIN, since the recipient IIN provided does not exist in its records. It aliases the new IIN to the recipient IIN which is the one embossed on the card. It then sends the PIN to the transferor. The card now contains funds and is ready to be used to draw cash. The consumer can use the card at any ATM connected to a network to which either the issuer or the issuer's network partner belongs. RAEC can be made freely available at ATMs or distributed for free to consumers by the issuer or sold at stores. Since they can receive funds from any of the issuer's payment instruments they can be used to draw cash immediately from the Instrument. So a money transfer recipient may choose not to go to the location of an offline merchant selling funds, to draw all or some funds from a payment instrument, but may instead transfer the funds to a stored-value card such as a RAEC and use it to draw funds from an ATM. The RAEC can be thrown away as there is no record associated with it and all that is lost is the cost of the card.

The RAEC instead of having funds transferred to it can be aliased to the IIN of the payment instrument. This means that all the funds for that payment instrument are available through the RAEC, unlike with a money transfer where the only funds available are those transferred to the RAEC. The RAEC because it is an alias can be used with other instruments that are also aliases e.g., a phone. So the consumer can perform phone payments with his phone or draw funds from an ATM with a RAEC and in both instances he is using funds from the same underlying payment instrument. After a payment transaction, the RAEC can be unaliased so that it is once again empty and has no funds associated with it. Although RPECs can also function like RAECs since they have magstripes that enable their use to draw cash at ATMs, they each have a record in the clearing server database which makes them less disposable than the RAEC and also means they cannot be used for aliasing.

In another embodiment RAECs (or RPECs) are used with phones to draw cash from an ATM. For example, a consumer will use a phone to transfer funds to a RAEC and then use the RAEC to draw funds from an ATM. The RAEC can be used for payments online with the embossed IIN and PIN. It can also be used offline to draw funds and to make purchases from both an alien network and from merchants that accept only the issuer's card. However if the merchant accepts cards from more than one issuer using the same POS device, then it would have no way of knowing to which issuer to send the RAEC's magstripe data since the IIN from the magstripe is that of the network partner and will not conform to the IIN format for the actual issuer. The RAEC may have two magstripes, one for drawing cash and making purchases from an alien network and the other for making purchases and drawing cash from the issuer's network.

The consumer does not have to purchase a stored-value card but may pay a merchant a cash amount that he wants "loaded" directly unto his phone. The method used is to do a money transfer from the merchant's account or payment instrument to the consumer and specifying his phone number as the recipient IIN. In another embodiment funds are transferred to an existing virtual payment instrument to which the consumer's phone number is then aliased. The consumer pays the merchant, the transfer is effected, and the consumer obtains voice or text confirmation that the phone now has the amount he paid (less any fees).

Security

Preventing "Phishing"

The IIN or alias along with the PIN is submitted to the merchant either directly or by phone. The merchant in turn submits this to the clearing server which then retrieves payment instrument records debits or credits the instrument funds, debits or credits the merchant and then sends a message to the merchant. The process occurs offline and online. Merchants, in order to be able to accept payments from an issuer's payment instrument, first register with the issuer and provide merchant identifying information and then install merchant software which handles communication with the issuer for payment processing.

The problem is that fraudsters may masquerade as registered merchants to "harvest" IINs and PINs. The unsuspecting consumer goes to the fraudster's site and submits an IIN (or alias) and PIN which the fraudster steals and later uses to make illegal payments. The consumer is often unaware that the fraudster is not a real merchant especially if the merchant delivers some good ostensibly purchased by the consumer. This problem which is very common online and is referred to as "phishing" is solved by the present invention.

Avoiding phishing requires that the online merchant when registering with the issuer specify the URL of his payment page. This is the page where the consumer enters his payment instrument IIN, personal details (and PIN if applicable). This URL is stored as data for that merchant in the merchant Tables of the clearing server database. The consumer after making a payment on the merchant's page submits the URL of the page, his payment instrument IIN and PIN to the clearing server. The clearing server now checks to see if a payment request on that IIN was received from that merchant. If not or if a payment on that IIN was approved from another merchant URL, the issuer cancels the approved payment and informs the consumer to change his PIN. The problem is that the consumer is still at risk, all the information required to make payment with his IIN has been stolen and will need to be changed. Personal information provided may not be easy to change. It would be preferable to identify the fraudulent merchant before submitting payment instrument and consumer Information. The method described below circumvents the phishing problem in 3 ways:

1. Using a challenge response format in entering IIN and PIN
2. Using One-Time IIN aliases and PIN Aliases
3. Using one-time PINs.

Challenge Response Payment Method

This method can be broken into several discrete steps.

1. During registration the merchant provides the URL of the page at which the IIN and PIN will be entered. During or after issue of a payment instrument to a consumer, he provides to the issuer a secret phrase (such as a birthdate or phrase), which has to be provided by the merchant when it receives the consumer's payment instrument IIN or alias.

2. The consumer who wishes to make a purchase submits only his IIN to the merchant and awaits a response. The merchant submits the IIN it receives to the clearing server and receives the secret phrase which it then displays to the consumer. This "challenge-response" scheme works because only a registered merchant can query the clearing server.

3. When the consumer receives his secret phrase from the merchant, he does not immediately enter his PIN number. The reason is that the merchant may be a fraudster acting as the "man-in-the-middle". He secretly passes the IIN it receives from the consumer to a real registered merchant and then forwards the secret phrase it receives from the real merchant to the consumer. If the consumer then provides his IIN, PIN, and personal information, the fraudster would have successfully harvested the payment instrument information with which to commit fraud.

4. Instead the consumer sends a query to the clearing server to determine which merchant requested his pass phrase. To do so the consumer submits his IIN and PIN to the clearing server and requests the URL of the merchant that made the request on his payment instrument. The clearing server confirms the PIN matches the IIN and then queries its clearing server database to find the merchant that made the inquiry. It then retrieves the URL for that merchant and sends it to the consumer.

5. The consumer receives the URL from the clearing server and then compares this with the URL of the page where he submitted the payment instrument. If the URL received from the clearing server differs from that for the page where the IIN was submitted then the merchant is a fraudster. If on the other hand, the URLs match then the merchant is a duly registered merchant and the consumer can submit payment instrument information for making a payment.

The steps described above can be collapsed into one step using software. The software is downloaded to the consumer's computing device and is primed with an IIN, PIN and the consumer's secret phrase for that IIN. The software can be used for multiple IINs and is activated by selecting the appropriate IIN from a drop down menu. The consumer when ready to make a payment at a merchant web site, starts the software and selects the IIN to be used for payment. The software then performs all the previously described steps to confirm that a merchant is validly registered. It populates the merchant's form field with the selected IIN, it confirms that the secret phrase received from the merchant matches what it has stored, It then submits the IIN and PIN to the clearing server, receives a URL, and compares this URL with the URL of the current page. If they match it can populate the PIN field or else prompt the consumer to do so. In another embodiment the consumer first submits his IIN, PIN and merchant URL to the clearing server before entering his IIN and PIN at the online merchant's site. If he clearing server does not receive a request from the merchant with that URL then fraud has occurred, and payment on the consumer's payment instrument is stopped. However the fraudulent merchant now has the IIN and PIN of the consumer's payment instrument either or both of which have to be changed.

As defined herein, the secret phrase may be any phrase, code or data that is associated with the consumer's payment instrument. The secret phrase may be something particularly personal to the consumer, but may be another piece of information not personal to the consumer or other words or data. By the use of software to accomplish most of the foregoing processes, the secret phrase can be a data stream that is, for the most part, meaningless to the consumer.

One-Time Aliasing

Aliasing allows a consumer to generate a payment instrument IIN for one time use. The consumer creates or requests a "one-time" alias. This is an alias that is created on the clearing server in its alias database tables for a specific IIN and used only once. After it is presented to the issuer in a payment request, it is removed from the alias table and cannot therefore be re-used. A One-time alias can be created either for the IIN or for the PIN 1) The clearing server can generate an IIN using its usual IIN generation algorithms and alias it to the payment instrument IIN. Since the clearing server checks both its IIN tables and its alias tables for each payment request it will resolve the alias to the actual IIN.

2) Upon request, the clearing server can generate a random number and alias it to the consumer's PIN. The random number generated has to be formatted in such a way that the issuer's clearing server can recognize it as an alias. It will need to create a PIN alias table in its clearing server database. This PIN can then be delivered to the consumer using a secure protocol such as https. Once the PIN is presented and validated for a payment transaction it is removed from the PIN alias table.

3) The clearing server or the consumer can generate a PIN for each IIN which is both usable one-time and must be used with a short time interval.

The merchant may therefore receive:
a) the IIN alias and PIN
b) IIN and PIN alias
c) IIN alias and PIN alias Any of the combinations is sent to the clearing server from the merchant which then confirms that either the IIN or PIN or both are aliases, removes the aliases from its tables and then downloads the payment instrument to the merchant. If either or both aliases are stolen after they are used for a payment transaction they cannot be reused. If either or both are stolen before they are used for a payment transaction, as when the consumer determines that a merchant is a fraudster, the issuer deletes the aliases.

The one-time aliases can be used by the consumer in cases where the merchant is not trusted or is not known. PIN and IIN aliasing however require that the alias be generated at and by the issuer and then communicated to the consumer. A different method is described below that enables either the consumer or the issuer to generate a One-Time PIN which can only be used once and expires after a short interval.

Generating One-Time PIN (OTPIN) with Expiration Time.

A One-Time PIN (OTPIN) is generated either at the issuer's web site or by One-Time Pin Generation software (OTPGS) software downloaded by the consumer. Either option uses the same PIN generation method described below. An OTPIN is generated for a specific payment instrument and must be used within a fixed time interval (for example, within one minute of generation) otherwise the payment request will be denied. To generate an OTPIN for a payment instrument at the issuer's web site, the consumer connects to issuer's web site and selects "generate OTPIN" from a menu. He is prompted to enter his payment instrument and PIN. The issuer confirms that the PIN matches the instrument and then the consumer is prompted to select a password which subsequently will be the only input required for generating an OTPIN for the payment instrument. The consumer confirms the password and an OTPIN is generated and displayed. The OTPIN must be used within a fixed time interval (for example, one minute) after which it will expire. In addition it can only be used only once. The consumer can then enter this IIN and this OTPIN at any online merchant where he wishes to make payment.

To make a payment to an online merchant (e.g., pay for a purchase), the consumer selects the product to purchase and the amount to pay. He is then prompted to enter his IIN and PIN. He enters his IIN (or alias) and the OTPIN. The merchant sees the OTPIN as a PIN. He forwards the IIN, OTPIN, payment amount, and MIN to the issuer who processes payment and returns an approval message to the merchant. Where the issuer mandates that OTPIN be the only type of PIN accepted for payment transactions, the merchant may run a check locally on receiving a PIN to confirm that it can be an OTPIN, provided that OTPINs have a particular format. For example, OTPINs may be generated in such a way that they always begin with the number "7" and are always over 9 digits long. If a PIN entered by the consumer does not meet these requirements, the merchant does not forward data to the issuer but instead displays an error and prompts the consumer to enter an OTPIN.

The consumer can generate an OTPIN locally on his computer or communications device. If the consumer does not already have the OTPGS (One-Time PIN Generation Software), he connects to the issuer's web site, and downloads and installs OTPGS on his computer or communications device (such as a cellular phone). He may also install it from media such as a CD. To generate an OTPIN, he starts OTPGS and goes through the same steps for generating an OTPIN on the issuer's web site. He is prompted to enter his payment instrument IIN and PIN, and then his password. The password is used subsequently by OTPGS to generate an OTPIN for that payment instrument. The password is confirmed and an OTPIN is generated and displayed. Although an OTPIN can be generated using the consumer's PIN, the illustrative embodiments described use a password which is different from the consumer's PIN The method of generating and using OTPINs at the issuer's web site is described in the steps below:

1. Each payment instrument on being created is assigned a random number called the seed. This seed along with the consumer's password is used to encrypt the current time using a symmetric encryption algorithm (i.e., An algorithm which uses the same key for encryption and decryption). The strength of the algorithm is directly related to the length of the seed. For example 64, 128, or 256 bit lengths can be used depending on the level of security required. The encrypted current time is the OTPIN. The issuer may choose to format the OTPIN. For example, it may ensure that the cipher text, (i.e., the encrypted time) has a minimum length and begins with a specific digit. This format allows it to eliminate numbers which cannot be OTPINs. For example, the issuer's regular PINs may be between 4 and 8 digits while its OTPINS are always longer than 9 digits and begin with the number "7". This prepended number in one embodiment also identifies the network of the issuer. Although not required, the present invention describes an illustrative embodiment where the issuer formats the OTPIN so that it is recognizable and different from an ordinary PIN. The current time is obtained from an NTP clock. For example, a stratum 2 NTP clock. Since an OTPIN has coarse time tolerances even lower stratum NTP clocks can be used. The consumer connects to the issuer's web site and enters his IIN and PIN. The issuer's clearing server, retrieves the record for the payment instrument with that IIN and validates the PIN entered. It then prompts the consumer to enter a password. If it is the first time that the consumer is generating an OTPIN, the password entered is stored for that payment instrument, if not the password entered is compared with the password stored the first time for that payment instrument. If the passwords match OTPIN generation proceeds, if not it terminates. The consumer may be given several chances to enter the correct password.

2. The clearing server then extracts the seed for that payment instrument from the seed table in its clearing server database.

3. If the password is not entirely numeric, it converts it to an all-numeric password using any of several schemes such as converting letters to their ASCII equivalent. The clearing server now has to generate a key with the seed and password and appends the password to the seed. However, in order to maintain a fixed key size, it overwrites the digits of the seed, beginning at the end, with the all-numeric password. It now has a new seed whose length is unchanged but whose digits include the password. This new seed is the encryption/decryption key. For example, if the seed is a 16 digit number 1234567890111213 and the numeric password is 58888 then the encryption/decryption key is 1234567890158888, still a 16 digit number.

4. It makes an NTP call to an NTP time server to obtain the current time (in UTC time format). UTC time (i.e., Coordinated Universal Time) is also called world time and is the same throughout the world. This UTC time is the plain text input which will be encrypted with the encryption key. The issuer's clearing server then uses the encryption key (created from the payment instrument seed and password) to encrypt the current time using any robust symmetric encryption algorithm such as DES. It prepends a specific number to the cipher text and outputs the result as the One-Time PIN.

OTPIN Generation from Downloaded Software

1. The first time OTPGS software is run on the consumer's computer or communications device, it prompts the consumer to enter its payment instrument IIN, and PIN and then his password. It then tries to connect to the issuer.

2. If there is no connection, OTPGS warns that it needs a connection to the issuer for PIN generation and exits.

3. If it connects to the issuer, OTPGS authenticates itself to the issuer's clearing server using either a protocol such as https or identifying numbers embedded in OTPGS. It then submits the IIN, PIN, and password entered by the consumer and asks for the seed and all the aliases for that IIN. This will allow an OTPIN to be generated using either the alias or the IIN of the payment instrument.

4. The clearing server checks that the IIN and Password received for that IIN match those in its records.

a. If either is wrong it returns an error and exits.

b. If they are both correct or if the PIN is correct but no password exists. Then it assumes that this is the password that will be used for OTPIN generation for that IIN and stores it. It then sends to the OTPGS software the seed for that payment instrument, its aliases, IIN and the current NTP time in UTC format.

c. Requests from OTPGS software that previously received a seed, will include that seed, the IIN, and password. The issuer validates the IIN and password and then compares the seed it received with the current seed in its table for that payment instrument. If they match it returns to OTPGS a new seed, along with the current NTP time, and aliases for that payment instrument. This means OTPGS gets a new seed each time it contacts the clearing server.

5. OTPGS now saves the IIN, its aliases, its seed, and the current time. The current time is used to generate the OTPIN but is also used to mark the time when the seed was obtained and is therefore called the "seed time"

6. If the password is not all-numeric OTPGS converts it to an all-numeric password. It then generates an encryption key by overwriting the seed beginning at the end with the consumer's all-numeric password. It then uses the encryption key (seed and password) to encrypt the current NTP time provided by the clearing server using the encryption algorithm provided by the issuer. A specific number is prepended to the resulting cipher text (e.g., a "7") which is then output as the OTPIN.

7. It discards the password from memory and never saves it to disk. Steps 1-7 occur the first time OTPGS is used to generate an OTPIN.

8. For subsequent requests for an OTPIN. The consumer selects the IIN or alias from a drop down menu. The OTPGS then prompts the consumer for a password for that payment instrument but it does not have to contact the clearing server to get a seed. It generates an encryption key using the password and the stored seed and then contacts either the clearing server or any stratum 2 NTP time server to obtain the current time in UTC time format. It then encrypts the time, prepends the specific number to it and outputs the result as an OTPIN.

9. If OTPGS cannot obtain NTP time it displays an error and exits. Communication devices such as cell phones obtain accurate time with low time drift from their carriers. OTPGS on such devices may not need to make an NTP call but may instead, extract the time on the device, convert it to UTC format, encrypt it, prepend a digit and output the result as an OTPIN.

10. OTPGS is programmed to obtain a new seed after a fixed time interval (e.g., 24 hours). So each time it has to generate an OTPIN, after obtaining NTP time, it will check this against the seed time to determine if enough time has passed for it to request a new seed from the issuer's clearing server. If it does not have to request a new seed, it encrypts the current time using the encryption key to obtain a cipher text. If it needs to request a new seed, it contacts the issuer to obtain a new seed. To do so it contacts the issuer's clearing server, authenticates, submits the IIN, password and current seed and obtains a new seed, and current NTP time. Both of which it saves. Again it does not save the password. The generation of OTPIN will always use a new seed for encryption after the fixed time interval passes (i.e. the current seed expires).

11. It generates a new encryption key using the new seed and the consumer's all-numeric password.

12. It prepends the specific digit to the cipher text and outputs that as the OTPIN.

OTPGS stores the payment instrument IIN, aliases and seed. It also uses the encryption key to encrypt the consumer's password and stores this on disk. This stored encrypted password is used for every subsequent OTPIN generation operation to confirm that the consumer has entered the correct password. The steps are as follows:

1. OTPGS receives the password entered by the consumer.
2. It generates an encryption key using this password and the payment instrument seed.
3. It encrypts the password with the encryption key and compares this with the encrypted password stored on disk. If they match it makes the NTP call, receives the current time in UTC format, encrypts the specific digit to it, and then outputs the result as the OTPIN. If the passwords do not match then the password is wrong and the consumer is prompted to re-enter the password. After a fixed number of failures OTPGS generates the OTPIN using the last password entered. For example, after one failure, the OTPGS gives a warning. Even if the second entry is correct, the OTPGS prompts the consumer to re-enter his password. It then uses the third password entry to generate a new encryption key (using the current seed) and a new stored encrypted password. It generates an OTPIN using the described method and informs the consumer that OTPIN has been generated with the last password entered. OTPGS generates an OTPIN after a certain number of attempts and does not display error messages after the first failure in order to prevent its use as a tool to crack a consumer's password. It also means that if the consumer changes his password at the issuer's site (it is changed at the issuer's site after the first time), he can still generate a correct OTPIN with his new password using OTPGS.

In order not to have to store state information for each payment instrument, the seed table in the clearing server database may hold two seeds per payment instrument. Whenever the "seed time" on the OTPGS exceeds the set interval, it makes a call to the issuer's clearing server, presents its current seed in addition to the IIN and password. The clearing server compares the seed it receives with the current seed for that payment instrument in its seed tables. If they match, i. It overwrites the current seed with the second seed in the payment instrument seed table.

ii. It generates a random number which becomes the second seed for that payment instrument iii. It gives the new seed with the current NTP time and payment instrument aliases to OTPGS. This new seed is now the current seed.

The clearing server may not provide the current NTP time but may provide only the payment instrument seed instead. OTPGS can then make a call to any stratum 2 NTP server to get the current time in UTC format which it then encrypts with the key (seed and password).

Issuer Validation of OTPIN

After the OTPIN and IIN are entered into the merchant's web site the combination along with payment amount and MIN is sent from the merchant to the issuer. The merchant sees the OTPIN as an ordinary PIN. The issuer recognizes the PIN as an OTPIN and then checks its clearing server database to determine if the OTPIN has been used before.

a. If it has, it rejects the request. And notes the URL and IP address of the requesting merchant.

b. If it has not been used before, the clearing server makes an NTP call either to the clearing server or to an NTP server to obtain the current time in UTC format. It does this before it begins encryption/decryption operations which may take time, and reduce the usability window of the OTPIN.

c. It then extracts the seed and password for that IIN from the appropriate tables in its clearing server database.

2. It generates an encryption/decryption key by converting the password to an all-numeric format and over-writing the seed beginning at the end.

3. It chops off the first digit (the prepended number) from the OTPIN and then decrypts the OTPIN. It now has the time when the OTPIN was created in UTC format and converts this to regular time. If the decryption of the OTPIN generates garbled output or the conversion does not generate time output, the issuer generates an error message to the merchant and denies the payment transaction. If the decryption generates time output, the clearing server subtracts the decrypted time from the current UTC time (which it has converted on receipt to regular time). If the time difference is less than the required interval (for example, 60 seconds), it means the OTPIN is good, was entered within the required time interval from generation and was created with the correct key (payment instrument seed and consumer password). The issuer then saves this OTPIN into a field for that IIN (so it cannot be reused), extracts the payment instrument records using its IIN and processes payment.

Both the issuer and the OTPGS may need to set a ceiling on the number of OTPINs that can be generated for one payment instrument per unit time. This is to minimize the number of used OTPINs the clearing server has to store in its clearing server database. If, for example, an OTPIN is to be used within 60 seconds and the clearing server wishes to hold no more than 4 used OTPINs per Instrument, then an OTPIN should be generated at no less than 15 second intervals for every payment instrument. The OTPIN generation method can therefore include time delays in amounts that fix the maximum number of used OTPINs that the clearing server needs to store in its clearing server databases.

A payment instrument issuer can make OTPIN generation and use mandatory either for all payment transactions or only for online payment transactions or only for phone payments. It increases the security of phone payments since unencrypted PINs can be stolen "over-the-air" and used for fraud. OTPINs reduce this risk since if it is stolen while being submitted, it cannot be used. If it is stolen before it is used it has to be transmitted from the consumer's phone as the SPOS device needs to obtain the consumer's phone number directly from its Caller ID device. If the consumer loses his phone, the thief has to know his password in order to generate an OTPIN. And if the consumer loses his phone immediately after generating an OTPIN. The thief would have to use the OTPIN for payment before it expires.

Using OTPIN for a Non-PIN Payment Instrument

This embodiment describes the use of OTPINs with a non-Pin payment instrument such as a credit card that does not natively support PINs. The issuer creates an alias made up of the IIN of the payment instrument plus a special number such as 99999. So the actual IIN for the payment instrument is aliased to the IIN+99999. The issuer specifies that only the alias will be used for this payment instrument (using the method disclosed in another embodiment of the present invention). The number 99999 tells the issuer that a one-time PIN with expiration has been submitted and should be validated.

When the consumer wants to make a purchase with the payment instrument, he generates a one time PIN submits it along with his payment instrument IIN to the merchant. The merchant then forwards this to the issuer along with his Merchant MIN and the payment amount. The issuer on receiving the IIN notes that only the alias table is to be searched for this Instrument. It searches the alias table using a wild card so it retrieves any alias beginning with the IIN of that instrument. It retrieves the alias IIN+99999, which means that payment processing for this payment instrument requires a One-Time PIN with an expiry time. It then applies the validation process for the PIN disclosed earlier in one embodiment of the present invention. If the OTPIN received was not submitted before, and has not expired, then the IIN record for the payment instrument is retrieved and payment is processed. The same method is used for phone payment with an OTPIN. A phone alias is created for an existing payment instrument but the alias is the phone number plus the special number 99999. The record for the payment instrument are set so that it can only be retrieved through the alias. Once a payment request is received a wild card search is performed on the alias table which displays the alias: phone number+99999 which means that phone payment with that instrument requires an OTPIN. The clearing server then validates the OTPIN as described in the disclosed embodiment of this invention and if it is correct processes payment.

In view of the foregoing discussion, it is intended that the appended claims be interpreted as including the embodiments described herein, the alternatives mentioned above, and all equivalents thereto.

What is claimed is:

1. A method of carrying out a financial transaction, comprising the steps of:

aliasing, by the issuer computer, a telephone number of a consumer to a payment instrument of the consumer;

assigning, by the issuer computer, a transaction phone number, a card comprising an identification number and a proxy device to an ID of a merchant wherein assigning the proxy device to an ID of a merchant further comprises mapping the ID of the merchant to an address and a phone number of the proxy device;

receiving, by the proxy device, via a call from a mobile device of the consumer via the transaction phone number, a PIN;

identifying, by the proxy device, using the call, a telephone number of the consumer and transmitting, by the proxy device, payment data comprising the identified telephone number of the consumer, the PIN and the proxy device address to the issuer computer;

identifying, by the issuer computer, the ID of the merchant using the transmitted proxy device address;

generating, by the issuer computer, a record in a database comprising the ID of the merchant and the payment data;

receiving, by the issuer computer, from a POS of the merchant, a transaction request comprising a payment amount, the ID of the merchant, and the identification number;

determining, by the issuer computer, using the identification number from the POS that the call is made by phone and based on that determination:

identifying, by the issuer computer, the record using the ID of the merchant received from the POS;

retrieving, by the issuer computer, the telephone number and PIN from the record;

retrieving, by the issuer computer, the payment instrument using the telephone number from the record;

processing the transaction request, by the issuer computer, using the retrieved PIN and payment instrument, and deleting, by the issuer computer, the record from the database.

* * * * *